United States Patent
Brudy et al.

(10) Patent No.: US 12,148,081 B2
(45) Date of Patent: Nov. 19, 2024

(54) IMMERSIVE ANALYSIS ENVIRONMENT FOR HUMAN MOTION DATA

(71) Applicant: AUTODESK, INC., San Francisco, CA (US)

(72) Inventors: Frederik Brudy, Toronto (CA); Fraser Anderson, Camrose (CA); Raimund Dachselt, San Rafael, CA (US); George Fitzmaurice, Toronto (CA); Justin Frank Matejka, Newmarket (CA); Patrick Reipschläger, San Rafael, CA (US)

(73) Assignee: AUTODESK, INC., San Francisco, CA (US)

( * ) Notice: Subject to any disclaimer, the term of this patent is extended or adjusted under 35 U.S.C. 154(b) by 112 days.

(21) Appl. No.: 17/677,826

(22) Filed: Feb. 22, 2022

(65) Prior Publication Data
US 2023/0267667 A1    Aug. 24, 2023

(51) Int. Cl.
| | |
|---|---|
| *G06T 13/40* | (2011.01) |
| *G06F 3/01* | (2006.01) |
| *G06T 7/70* | (2017.01) |
| *G06T 19/00* | (2011.01) |
| *G06V 40/20* | (2022.01) |

(52) U.S. Cl.
CPC .............. *G06T 13/40* (2013.01); *G06F 3/011* (2013.01); *G06T 7/70* (2017.01); *G06T 19/006* (2013.01); *G06V 40/23* (2022.01); *G06T 2207/30196* (2013.01)

(58) Field of Classification Search
CPC ......... G06T 13/40; G06T 7/70; G06T 19/006; G06T 2207/30196; G06V 40/23; G06F 3/011
See application file for complete search history.

(56) References Cited

U.S. PATENT DOCUMENTS

| | | | |
|---|---|---|---|
| 2010/0125799 A1* | 5/2010 | Roberts .................... | G06F 3/011 715/757 |
| 2010/0277411 A1* | 11/2010 | Yee .......................... | G06F 3/017 382/103 |
| 2012/0004031 A1* | 1/2012 | Barney ................... | A63F 13/825 463/31 |
| 2012/0155705 A1* | 6/2012 | Latta ........................ | G06F 3/017 382/103 |

(Continued)

OTHER PUBLICATIONS

Aigner et al., "Visual Methods for Analyzing Time-Oriented Data", IEEE Transactions on Visualization and Computer Graphics, Doi: 10.1109/TVCG.2007.70415, vol. 14, No. 1, Jan./Feb. 2008, pp. 47-60.

(Continued)

*Primary Examiner* — Terrell M Robinson
(74) *Attorney, Agent, or Firm* — Artegis Law Group, LLP

(57) ABSTRACT

One embodiment of a computer-implemented method for analyzing human motion data includes receiving a set of motion data that indicates one or more movements of a first person within a real-world environment; generating a virtual avatar corresponding to the first person based on the set of motion data; determining a position of the virtual avatar within an extended reality (ER) scene based on the one or more movements; and displaying the virtual avatar in the ER scene according to the determined position.

18 Claims, 10 Drawing Sheets

(56) References Cited

U.S. PATENT DOCUMENTS

| | | | |
|---|---|---|---|
| 2013/0150159 A1* | 6/2013 | El Dokor | A63F 13/00 463/32 |
| 2013/0249864 A1* | 9/2013 | Wu | G06F 3/0418 345/175 |
| 2015/0277570 A1* | 10/2015 | Kauffmann | G06F 3/011 345/156 |
| 2019/0221088 A1* | 7/2019 | Yeh | G07F 17/3206 |

OTHER PUBLICATIONS

Andrienko et al., "Clustering Trajectories by Relevant Parts for Air Traffic Analysis", IEEE Transactions on Visualization and Computer Graphics, https://doi.org/10.1109/TVCG.2017.2744322, vol. 24, No. 1, Jan. 2018, pp. 34-44.

Andrienko et al., "Visualization of Trajectory Attributes in Space-Time Cube and Trajectory Wall", DOI: 10.1007/978-3-642-32618-9_11, 2014, pp. 157-163.

Andrienko et al., "Visual analytics of movement: An overview of methods, tools and procedures", Information Visualization, https://doi.org/10.1177/1473871612457601, vol. 12, No. 1, 2013, 22 pages.

Andrienko et al., "Exploratory spatio-temporal visualization: an analytical review", Journal of Visual Languages & Computing, https://doi.org/10.1016/S1045-926X(03)00046-6, vol. 14, No. 6, 2003, pp. 503-541.

Arora et al., "SymbiosisSketch: Combining 2D & 3D Sketching for Designing Detailed 3D Objects in Situ", Paper 185, https://doi.org/10.1145/3173574.3173759, Apr. 21-26, 2018, pp. 185:1-185:15.

Azar et al., "Agent-Based Modeling of Occupants and Their Impact on Energy Use in Commercial Buildings", Journal of Computing in Civil Engineering, https://doi.org/10.1061/(ASCE)CP.1943-5487.0000158, vol. 26, Jul./Aug. 2012, pp. 506-518.

Bach et al., A Review of Temporal Data Visualizations Based on Space-Time Cube Operations, Eurographics Conference on Visualization, https://doi.org/10.2312/eurovisstar.20141171, 2014, pp. 1-19.

Batch et al., "There is No Spoon: Evaluating Performance, Space Use, and Presence with Expert Domain Users in Immersive Analytics", IEEE Transactions on Visualization and Computer Graphics, https://doi.org/10.1109/TVCG.2019.2934803, vol. 26, No. 1, Jan. 2020, 11 pages.

Brudy et al., "EagleView: A Video Analysis Tool for Visualising and Querying Spatial Interactions of People and Devices", Session 2: Multi-camera Set-ups for MultI-user Spaces, https://doi.org/10.1145/3279778.3279795, Nov. 25-28, 2018, pp. 61-72.

Büschel et al., "MIRIA: A Mixed Reality Toolkit for the In-Situ Visualization and Analysis of Spatio-Temporal Interaction Data", In Proceedings of the 2021 CHI Conference on Human Factors in Computing Systems, https://doi.org/10.1145/3411764.3445651, May 8-13, 2021, 15 pages.

Büschel et al., "Investigating Smartphone-Based Pan and Zoom in 3D Data Spaces in Augmented Reality", In Proceedings of the 21st International Conference on Human-Computer Interaction with Mobile Devices and Services, Doi.org/10.1145/3338286.3340113, Article 2, 2019, 13 pages.

Büschel et al., "Investigating the Use of Spatial Interaction for 3D Data Visualization on Mobile Devices", https://doi.org/10.1145/3132272.3134125, Oct. 17-20, 2017, pp. 62-71.

Buschmann et al., "Animated visualization of spatial-temporal trajectory data for air-traffic analysis", The Visual Computer, https://doi.org/10.1007/s00371-015-1185-9, vol. 32, No. 3, 2016, pp. 371-381.

Butcher et al., "VRIA: A Web-Based Framework for Creating Immersive Analytics Experiences", IEEE Transactions on Visualization and Computer Graphics, vol. 27, No. 7, 2021, pp. 3213-3225.

Butscher et al., "Clusters, Trends, and Outliers: How Immersive Technologies Can Facilitate the Collaborative Analysis of Multidimensional Data", Paper 90, https://doi.org/10.1145/3173574.3173664, 2018, pp. 1-12.

Börner et al., "Social Diffusion Patterns in Three-Dimensional Virtual Worlds", Information Visualization, https://doi.org/10.1057/palgrave.ivs.9500050, vol. 2, No. 3, 2003, pp. 182-198.

Cao et al., "GhostAR: A Time-Space Editor for Embodied Authoring of Human-Robot Collaborative Task with Augmented Reality", In Proceedings of the 32nd Annual ACM Symposium on User Interface Software and Technology, https://doi.org/10.1145/3332165.3347902, Oct. 20-23, 2019, pp. 521-534.

Cao et al., "Long-term Human Motion Prediction with Scene Context", 2020, 24 pages.

Cao et al., "Realtime Multi-Person 2D Pose Estimation Using Part Affinity Fields", In Proceedings of the IEEE Conference on Computer Vision and Pattern Recognition (CVPR), 2017, 9 pages.

Cavallo et al., "Dataspace: A Reconfigurable Hybrid Reality Environment for Collaborative Information Analysis", https://doi.org/10.1109/VR.8797733, 2019, pp. 145-154.

Cavallo et al., "Immersive Insights: A Hybrid Analytics System for Collaborative Exploratory Data Analysis", In 25th ACM Symposium on Virtual Reality Software and Technology, https://doi.org/10.1145/3359996.3364242, 2019, 12 pages.

Cordeil et al., "ImAxes: Immersive Axes As Embodied Affordances for Interactive Multivariate Data Visualisation", https://doi.org/10.1145/3126594.3126613, Oct. 22-25, 2017, pp. 71-83.

Dai et al., "Visual analytics of urban transportation from a bike-sharing and taxi perspective", Journal of Visualization, https://doi.org/10.1007/s12650-020-00673-8, vol. 23, No. 6, 2020, 18 pages.

Decamp et al., "An Immersive System for Browsing and Visualizing Surveillance Video", In Proceedings of the 18th ACM International Conference on Multimedia, https://doi.org/10.1145/1873951.1874002, 2010, pp. 371-380.

Dwyer et al., "Immersive Analytics: An Introduction", https://doi.org/10.1007/978-3-030-01388-2, 2018, pp. 1-23.

Fabbri et al., "Learning to Detect and Track Visible and Occluded Body Joints in a Virtual World", In European Conference on Computer Vision, 2018, 17 pages.

Filho et al., "Evaluating an Immersive Space-Time Cube Geovisualization for Intuitive Trajectory Data Exploration", IEEE Transactions on Visualization and Computer Graphics, https://doi.org/10.1109/TVCG.2019.2934415, vol. 26, No. 1, Jan. 2020, 11 pages.

Guo et al., "TripVista: Triple Perspective Visual Trajectory Analytics and its application on microscopic traffic data at a road intersection", IEEE Pacific Visualization Symposium, https: //doi.org/10.1109/PACIFICVIS.2011.5742386, 2011, pp. 163-170.

Hoobler et al., "Visualizing Competitive Behaviors in Multi-User Virtual Environments", In IEEE Visualization, https://doi.org/10.1109/VISUAL.2004.120, 2004, pp. 163-170.

Hubenschmid et al., "STREAM: Exploring the Combination of Spatially-Aware Tablets with Augmented Reality Head-Mounted Displays for Immersive Analytics", Association for Computing Machinery, https://doi.org/10.1145/3411764.3445298, 2021, 14 pages.

Joo et al., "Panoptic Studio: A Massively Multiview System for Social Interaction Capture", IEEE Transactions on Pattern Analysis and Machine Intelligence, 2017, 15 pages.

Kepplinger et al., "See, Feel, Move: Player Behaviour Analysis through Combined Visualization of Gaze, Emotions, and Movement", Association for Computing Machinery, https://doi.org/10.1145/3313831.3376401, Apr. 25-30, 2020, pp. 1-14.

Kloiber et al., "Immersive analysis of user motion in VR applications", The Visual Computer, https://doi.org/10.1007/s00371-020-01942-1, vol. 36, No. 10, Aug. 12, 2020, 13 pages.

Lange et al., "Trajectory Mapper: Interactive Widgets and Artist-Designed Encodings for Visualizing Multivariate Trajectory Data", In Proceedings of the Eurographics, https://DOI: 10.2312/eurovisshort.20171141, 2017, pp. 103-107.

Langner et al., "MARVIS: Combining Mobile Devices and Augmented Reality for Visual Data Analysis", https://doi.org/10.1145/3411764.3445593, May 8-13, 2021, 17 pages.

Lanir et al., "Visualizing museum visitors' behavior: Where do they go and what do they do there?", Personal and Ubiquitous Computing, https://doi.org/10.1007/s00779-016-0994-9, 2017, 14 pages.

Lee et al., "Demo: Semantic Human Activity Annotation Tool Using Skeletonized Surveillance Videos", https://doi.org/10.1145/3341162.3343807, Sep. 9-13, 2019, pp. 312-315.

(56) References Cited

OTHER PUBLICATIONS

Lilija et al., "Who Put That There? Temporal Navigation of Spatial Recordings by Direct Manipulation", Association for Computing Machinery, https://doi.org/10.1145/3313831.3376604, Paper 477, Apr. 25-30, 2020, pp. 1-11.
Mahmood et al., "Improving Information Sharing and Collaborative Analysis for Remote GeoSpatial Visualization Using Mixed Reality", IEEE International Symposium on Mixed and Augmented Reality, https://doi.org/10.1109/ISMAR.2019.00021, 2019, pp. 236-247.
Marquardt et al., "EXCITE: EXploring Collaborative Interaction in Tracked Environments", In Human-Computer Interaction, IFIP, 2015, pp. 89-97.
Mehta et al., "Single-Shot Multi-Person 3D Pose Estimation From Monocular RGB", In 3D Vision (3DV), Aug. 28, 2018, 16 pages.
Moura et al., "Visualizing and Understanding Players' Behavior in Video Games: Discovering Patterns and Supporting Aggregation and Comparison", https://doi.org/10.1145/2018556.2018559, 2011, pp. 11-15.
Nakazawa et al., "Analysis and synthesis of human dance motions", In Proceedings of IEEE International Conference on Multisensor Fusion and Integration for Intelligent Systems, https://doi.org/10.1109/MFI-2003.2003.1232637, 2003, pp. 83-88.
Nebeling et al., "MRAT: The Mixed Reality Analytics Toolkit", Association for Computing Machinery, https://doi.org/10.1145/3313831.3376330, Apr. 25-30, 2020, pp. 1-12.
Reipschläger et al., "Personal Augmented Reality for Information Visualization on Large Interactive Displays", IEEE Transactions on Visualization and Computer Graphics, https://doi.org/10.1109/TVCG.2020.3030460, vol. 27, No. 2, 2021, 11 pages.
Rosenbaum et al., "Involve Me and I Will Understand !—Abstract Data Visualization in Immersive Environments", In Advances in Visual Computing, 2011, 11 pages.
Sacha et al., "Dynamic Visual Abstraction of Soccer Movement", Computer Graphics Forum, https://doi.org/10.1111/cgf.13189, vol. 36, No. 3, 2017, pp. 305-315.
Saenz et al., "Reexamining the cognitive utility of 3D visualizations using augmented reality holograms", Immersive Analytics: Exploring Future Interaction and Visualization Technologies for Data Analytics, Oct. 1-6, 2017, 5 pages.
Sereno et al., "Supporting Volumetric Data Visualization and Analysis by Combining Augmented Reality Visuals with Multi-Touch Input", https://doi.org/10.2312/eurp.20191136, 2019, pp. 21-23.
Simon et al., "Hand Keypoint Detection in Single Images using Multiview Bootstrapping", 2017, pp. 1145-1153.
Ssin et al., "GeoGate: Correlating Geo-Temporal Datasets Using an Augmented Reality Space-Time Cube and Tangible Interactions", IEEE Conference on Virtual Reality and 3D User Interfaces, https://doi.org/10.1109/VR.2019.8797812, 2019, pp. 210-219.
Tang et al., "VisTACO: Visualizing Tabletop Collaboration", In ACM International Conference on Interactive Tabletops and Surfaces, https://doi.org/10.1145/1936652.1936659, Nov. 7-10, 2010, pp. 29-38.
Tominski et al., "Stacking-Based Visualization of Trajectory Attribute Data", IEEE Transactions on Visualization and Computer Graphics, https://doi.org/10.1109/TVCG.2012.265, vol. 18, No. 12, Dec. 2012, pp. 2565-2574.
Marcard et al., "Recovering Accurate 3D Human Pose in the Wild Using IMUs and a Moving Camera", In European Conference on Computer Vision, 2018, pp. 614-631.
Zadow et al., "GIAnT: Visualizing Group Interaction at Large Wall Displays", Intelligent Visualization Systems, https://doi.org/10.1145/3025453.3026006, May 6-11, 2017, pp. 2639-2647.
Filho et al., "Immersive Visualization of Abstract Information: An Evaluation on Dimensionally-Reduced Data Scatterplots", IEEE Conference on Virtual Reality and 3D User Interfaces (VR), https://doi.org/10.1109/VR.2018.8447558, 2018, pp. 483-490.
Walsh et al., "Temporal-Geospatial Cooperative Visual Analysis", Big Data Visual Analytics, https://doi.org/10.1109/BDVA.2016.7787050, 2016, 8 pages.
Zhang et al., "Using Virtual Reality Technique to Enhance Experience of Exploring 3D Trajectory Visualizations", Association for Computing Machinery, https://doi.org/10.1145/2801040.2801072, 2015, pp. 168-169.

\* cited by examiner

500

```
┌─────────────────────────────────────────────────────────────┐
│ Receive motion data associated with movements of one or      │
│ more people within a 3D environment                          │
│ 502                                                          │
└─────────────────────────────────────────────────────────────┘
                              │
                              ▼
┌─────────────────────────────────────────────────────────────┐
│ Process the motion data to generate, for each person, a      │
│ virtual avatar corresponding to the person                   │
│ 504                                                          │
└─────────────────────────────────────────────────────────────┘
                              │
                              ▼
┌─────────────────────────────────────────────────────────────┐
│ Determine position of each virtual avatar within an ER scene │
│ of the 3D environment at an initial time                     │
│ 506                                                          │
└─────────────────────────────────────────────────────────────┘
                              │
                              ▼
┌─────────────────────────────────────────────────────────────┐
│ Display each virtual avatar within the ER scene based on the │
│ position of the virtual avatar and a current viewpoint of    │
│ the user                                                     │
│ 508                                                          │
└─────────────────────────────────────────────────────────────┘
```

FIG. 5

IMMERSIVE ANALYSIS ENVIRONMENT FOR HUMAN MOTION DATA

BACKGROUND

Field of the Various Embodiments

The various embodiments relate generally to computer science and data processing and, more specifically, to an immersive analysis environment for human motion data.

Description of the Related Art

Analyzing human movement within a space can provide insights into the utilization of the space, human behavior patterns, and how complex work sequences performed. For example, the movement of visitors within a museum can be analyzed to determine which exhibitions visitors attend, how long visitors spend at different locations within the museum, how visitors interact with a display, and the like. Effective analysis of movement data, therefore, necessitates the use of tools that can directly relate human movement to the surrounding environment.

Typical approaches for analyzing human movement involves performing analysis of spatial data that indicate the locations of people at different points in time within a space. Analysis of spatial data usually is performed using data visualizations, such as and without limitation, two-dimensional (2D) or three-dimensional (3D) trajectory plots, heatmaps, line charts, and parallel coordinates. For example, trajectories of people within a space can be displayed within a 2D or 3D floorplan of the space in order to visualize the movement of people relative to the floorplan. As a general matter, data visualizations provide an overview of the overall positions of people within the space, usually do not provide sufficient context regarding the space for which the spatial data analysis is being performed. In particular, data visualizations typically do not convey how people behave within the space or interact with other people or objects within the space.

One approach for adding context to a data visualization about how the movement of people within a given space relates to the space itself and the objects within the space is to display the data visualization within an augmented-reality (AR) or virtual-reality (VR) environment that is commensurate with the space in which the spatial data making up the data visualization was captured. Displaying a data visualization in such an AR or VR environment can provide a user with a better understanding of the space in which the spatial data was captured in the first instance and, accordingly, provide the user with more context about the movements of persons within that space. Nevertheless, data visualizations displayed within AR or VR environments usually provide users with only a higher-level understanding of the overall positions of persons within given spaces and do not provide any information about how those persons behave within those spaces or interact with other people or objects within those spaces.

As the foregoing illustrates, what is needed in the art are more effective techniques for analyzing human motion data within given spaces.

SUMMARY

One embodiment of the present disclosure sets forth a computer-implemented method for analyzing human motion data. The method includes receiving a set of motion data that indicates one or more movements of a first person within a real-world environment. The method further includes generating a virtual avatar corresponding to the first person based on the set of motion data. In addition, the method includes determining a position of the virtual avatar within an extended reality (ER) scene based on the one or more movements and displaying the virtual avatar in the ER scene according to the determined position.

At least one technical advantage of the disclosed techniques relative to the prior art is that, with the disclosed techniques, human motion data is more effectively analyzed and visualized in the context of the space in which the human motion data was captured. In particular, by generating data visualizations that include virtual avatars of people within a given space, human motion data analysis can be performed that analyzes specific behaviors and interactions of the people within the space. Accordingly, using the disclosed techniques, more detailed analysis of human movement can be performed relative to prior approaches that provide only a high-level overview of human movement within a space. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 5 is a flowchart of method steps for generating virtual avatars within an extended reality environment based on captured motion data, according to various embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
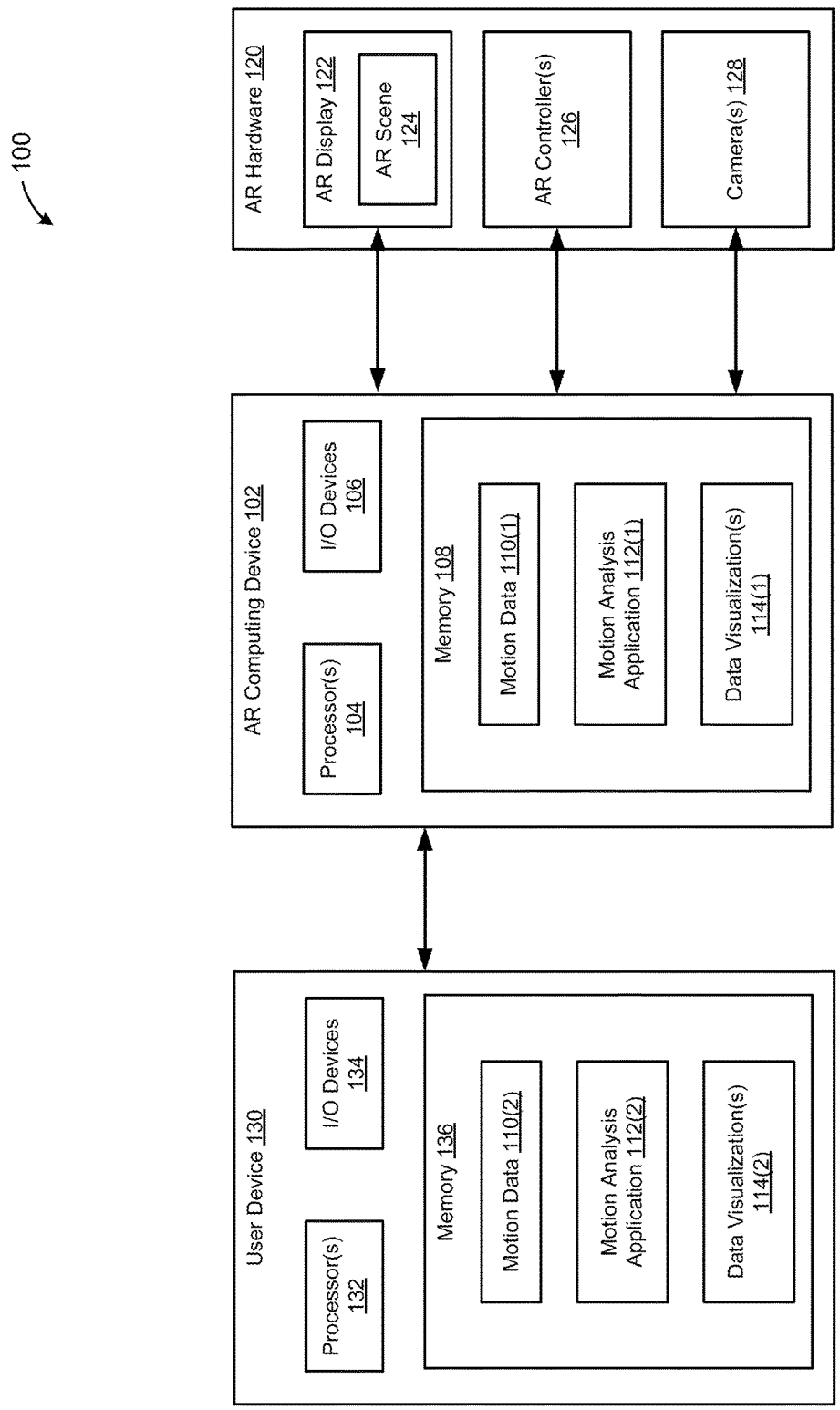
FIG. 1 is a block diagram illustrating a system configured to implement one or more aspects of the various embodiments.

FIG. 1 is a block diagram illustrating a system 100 configured to implement one or more aspects of the various embodiments. As shown, system 100 includes, without limitation, an augmented-reality (AR) computing device 102 connected to AR hardware 120 and a user computing device 130. AR computing device 102 comprises one or more processors 104, input/output (I/O) devices 106, and memory 108. AR computing device 102 can be a server, personal computer, laptop or tablet computer, mobile computer system, or any other device suitable for practicing the various embodiments described herein. In various embodiments, one or more AR hardware 120, such as AR display 122, are integrated with the one or more processors 104 and memory 108 on the same device, such as a head-mounted display (HMD).

In general, the one or more processors 104 include any suitable processing device or hardware unit capable of processing data and executing software applications and program code. For example, the one or more processors 104 could include a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU.

I/O devices 106 include devices capable of providing input as well as devices capable of providing output. The I/O devices 106 can include input and output devices not specifically shown in AR hardware 120, such as a network card for connecting to a network, a speaker, and the like. I/O devices 106 can also include devices capable of both receiving input and providing output, such as a touchscreen, a universal serial bus (USB) port, and so forth.

Memory 108 can be any technically feasible storage medium configured to store data and software applications. Memory 108 includes, for example, a hard disk, a random-access memory (RAM), a read-only memory (ROM), a flash memory unit, or any other type of memory unit or combination thereof. The one or more processors 104 and I/O devices 106 read data from and write data to memory 108. Memory 108 includes various software programs that can be executed by the one or more processors 104 and application data associated with said software programs, including motion data 110(1), motion analysis application 112(1), and one or more data visualizations 114(1). As described in further detail below, in various embodiments, motion analysis application 112(1) is configured to process motion data 110(1) and generate the one or more data visualizations 114(1).

As shown in FIG. 1, in some embodiments, system 100 further includes a user device 130. User device 130 comprises one or more processors 132, input/output (I/O) devices 134, and memory 136. User device 130 can be a personal computer, laptop or tablet computer, mobile computer system, or any other device suitable for practicing the various embodiments described herein.

In general, the one or more processors 132 include any suitable processing device or hardware unit capable of processing data and executing software applications and program code. For example, the one or more processors 132 could include a central processing unit (CPU), a graphics processing unit (GPU), an application-specific integrated circuit (ASIC), a field programmable gate array (FPGA), and so forth. I/O devices 134 include devices capable of providing input, such as a keyboard, a mouse, a touch-sensitive screen, and so forth, as well as devices capable of providing output, such as a display device. Additionally, I/O devices 134 can include devices capable of both receiving input and providing output, such as a touchscreen, a universal serial bus (USB) port, and so forth. In some embodiments, one or more of I/O devices 134 are configured to communicatively couple user device 130 to AR computing device 102. User device 130 can communicate with AR computing device 102 using any technically feasible communication links, including wireless communication links, wired communication links, or a combination thereof, such as a local area network (LAN), wide area network (WAN), the World Wide Web, the Internet, and the like.

Memory 136 can be any technically feasible storage medium configured to store data and software applications. Memory 136 could be, for example, a hard disk, a random-access memory (RAM), a read-only memory (ROM), a flash memory unit, or any other type of memory unit or combination thereof. Memory 136 includes various software programs that can be executed by processing unit(s) 132 and application data associated with said software programs, including motion data 110(2), motion analysis application 112(2), and one or more data visualizations 114(2). As discussed in further detail below, in various embodiments, motion analysis application 112(2) is configured to operate in conjunction with motion analysis application 112(1) to generate and/or display one or more data visualizations 114(2). The one or more data visualizations 114(2) can be used to provide additional information relating to data visualizations 114(1) generated by motion analysis application 112(1) and/or control the one or more data visualizations 114(1).

Motion Data Visualization in Extended Reality Environments

As shown in FIG. 1, AR computing device 102 is connected to various AR hardware 120, including an AR display 122, one or more AR controllers 126, and one or more cameras 128. AR display 122 displays an AR scene 124 of a 3D augmented environment that includes a real-world physical environment. In some embodiments, AR display 122 displays a live camera stream or feed that is captured by the one or more cameras 128. In some embodiments, AR display 122 is a see-through display such that a user can see the real-world physical environment through AR display 122. AR scene 124 can include one or more real-world objects and/or one or more virtual objects. The one or more virtual objects are overlaid onto the real-world environment of AR scene 124. The one or more AR controllers 126 enable a user to interact with the one or more real-world objects and/or one or more virtual objects via mid-air movements, buttons, triggers, and so on.

In various embodiments, AR display 122 is configured to receive one or more data visualizations 114(1) and display the one or more data visualizations 114(1) in AR scene 124. A user can interact with the one or more data visualizations 114(1) using the one or more AR controllers 126. Based on the user interactions with a data visualization 114(1), motion analysis application 112(1) modifies the data visualization 114(1) and/or generates one or more additional data visualizations 114(1).

Although embodiments are described herein with respect to an AR environment and AR hardware and applications, the techniques described herein can be implemented with any type of extended-reality (ER) environment, such as virtual-reality (VR) environments and mixed-reality (MR) environments, using any suitable ER hardware. For example, in other embodiments, system 100 could include VR-specific hardware and software components. VR hardware could include, for example, a VR headset, one or more VR controllers, tracking devices for the one or more VR controllers, and the like. VR software could include a VR application or VR engine that renders a VR scene of a 3D virtual environment for display on the VR headset. In such embodiments, the one or more data visualizations 114(1) generated by motion analysis application 112(1) are displayed within the VR scene of the 3D virtual environment. Additionally, the 3D virtual environment could be a virtual representation of a real-world environment in which motion data 110(1) was captured.

Motion data 110(1) can be any type of data that indicates the position and orientation of one or more people within the 3D space over a period of time. Motion data 110(1) could, for example, correspond to movements of one or more people within a real-world space, movements of one or more virtual avatars within a virtual space, simulated or artificially generated movements, and/or a combination thereof. Motion data 110(1) can be generated or captured by any suitable system or device using any technically feasible techniques. For example, real-world movements could be captured by a motion tracking system, one or more motion tracking devices, one or more cameras, or other motion capture systems or devices. As another example, artificial movements could be generated by predicting movements of the one or more people within a real-world space based on previously captured movements of people within the real-world space.

Motion data 110(1) includes, at each point time during the period of time, the position and orientation of one or more people within the 3D space. The position of a person indicates the location within the 3D space at which the person is located at a given point in time. The orientation of the person indicates the direction that the person is facing at a given point in time. The number of people within the 3D space can vary between different points in time. Additionally, the people present in the 3D space can vary between different points in time, for example, due to people entering and/or leaving the 3D space.

Motion data 110(1) can include any technically feasible level of detail. The level of detail included in motion data 110(1) can vary depending on how the motion data 110(1) was captured and/or generated. For example, motion data 110(1) could also include, for each person at each point in time, the position of different joints and/or body parts of the person, such as the head, shoulders, elbows, wrists, hands, hips, knees, ankles, etc. The types of joints and/or body parts, as well as the number of joints and/or body parts, can vary depending on the source of the motion data 110(1).

Motion analysis application 112(1) performs one or more data analytics operations on the motion data 110(1) to generate one or more data visualizations 114(1). As explained in further detail below, the types of data analytic operations performed can vary depending on the type of data visualization 114(1) being generated. For a target data visualization 114(1), motion analysis application 112(1) performs one or more data analytics operations associated with generating the target data visualization 114(1).

In some embodiments, the one or more data analytics operations include data analytics operations on a subset of motion data 110(1) associated with a given point in time. Motion analysis application 112(1) processes the motion data 110(1) to identify the subset of motion data 110(1). Motion analysis application 112(1) analyzes the subset of motion data 110(1) to determine, for example, a number of people within a 3D space at the given point in time, a position and/or orientation of each person, a pose (positions of different joints and/or body parts) of each person, the number of people at a given location within the 3D space at the given point in time, location(s) within the 3D space with the most people at the given point in time, location(s) within the 3D space with the fewest people at the given point in time, and the like.

Additionally, motion analysis application 112(1) could process motion data 110(1) to identify a subset of motion data 110(1) associated with a given person at a given point in time. Motion analysis application 112(1) could analyze the subset of motion data 110(1) to determine, for example, a position and/or orientation of the person, an overall pose of the person, and/or a position and/or orientation of one or more specific body parts of the person, such as the eyes, hands, feet, fingers, etc.

In some embodiments, the one or more data analytic operations include data analytics operations on a subset of motion data 110(1) associated with a given period of time. Motion analytics application 112(1) processes the motion data 110(1) to identify the subset of motion data 110(1). Motion analysis application 112(1) analyzes the subset of motion data 110(1) to determine, for example, a trajectory within a 3D space of each person in 3D space during the period of time, the positions and/or orientations of each person at different points in time during the period of time, poses of each person at different points in time during the period of time, an amount of people that were at a given location within the 3D space during the period of time, an amount of people that were at each location within the 3D space during the period of time, location(s) within the 3D space that had the most people during the period of time, location(s) within the 3D space that had the fewest people during the period of time, how long one or more people spent at a given location within the 3D space, location(s) within the 3D space that people stayed at the longest, location(s) within the 3D space that people stayed at the shortest, and the like.

Additionally, motion analysis application 112(1) could process motion data 110(1) to identify a subset of motion data 110(1) associated with a given person during the period of time. Motion analysis application 112(1) could analyze the subset of motion data 110(1) to determine, for example, a trajectory of the given person within the 3D space during the period of time, a trajectory of a body part of the given person within the 3D space during the period of time, positions and/or orientations of the given person at different points in time during the period of time, poses of the given person at different points in time during the period of time, positions and/or orientations of a body part of the given person at different points in time during the period of time, an amount of time that the person spent at a given location during the period of time, amounts of time that the person spent at different locations during the period of time, a location at which the given person spent the longest amount of time, a location at which the given person spent the shortest amount of time, and the like.

Motion analysis application 112(1) generates one or more data visualizations 114(1) associated with the results of the data analytic operations. Each data visualization 114(1) includes one or more 2D objects and/or 3D objects that can be displayed within an ER environment, such as within AR scene 124. The one or more 2D objects and/or 3D objects are rendered at specific locations within the ER environment based on motion data 110(1). For example, if a data visualization 114(1) corresponds to a specific person at a specific time, then motion analysis application 112(1) determines, based on motion data 110(1), the location of the specific person at the specific time. The data visualization 114(1) could be displayed at a location in the ER environment that corresponds to the location of the specific person at the specific time.

In various embodiments, the one or more data visualizations 114(1) include, for one or more people whose movements were captured in motion data 110(1), a virtual avatar corresponding to each person. Each virtual avatar is a human-shaped 3D model that is used to represent the corresponding person within an ER environment. In some embodiments, motion analysis application 112(1) associates a different color to each person whose movements were captured in motion data 110(1). Each virtual avatar is rendered in the ER environment using the color associated with the corresponding person. For example, assume motion data 110(1) includes movement information for a first person and a second person. Motion analysis application 112(1) could associate the first person with the color blue and the second person with the color red. Motion analysis application 112(1) generates a first virtual avatar corresponding to the first person and a second virtual avatar corresponding to the second person. The first virtual avatar is displayed with a blue color and the second virtual avatar is displayed with a red color.

In some embodiments, motion analysis application 112(1) stores a pre-generated human-shaped 3D model. To generate a virtual avatar for a person, motion analysis application 112(1) analyzes motion data 110(1) to determine a physical size of the person. Motion analysis application 112(1) scales the size of the 3D model according to the physical size of the person. Motion analysis application 112(1) uses the scaled 3D model as the virtual avatar for the person. Because the size of the virtual avatar matches the physical size of the corresponding person, when placed within an ER environment, the virtual avatar can be used to determine what objects and/or portions of the ER environment the corresponding person would be able to see, reach, or otherwise interact with.

In some embodiments, motion analysis application 112(1) determines a physical size of a person based on the positions of different joints and/or body parts of the person. Motion analysis application 112(1) determines a location a first joint or body part of the person and a location of a second joint or body part of the person based on motion data 110(1). Motion analysis application 112(1) computes a body dimension associated with the person based on the location of the first joint or body part and the location of the second joint or body part. A body dimension could be, for example, a height of the person, a width or size of the person, head length, shoulder width, arm length, torso length, leg length, and the like. The specific joints and/or body parts whose locations are used to compute a body dimension can vary depending on the specific body dimension being computed. Similarly, the body dimensions that can be computed can vary depending on the joint and/or body part locations that are indicated in motion data 110(1). For example, if motion data 110(1) indicates the positions of the head and the feet of a person, then motion analysis application 112(1) could compute a height of the person based on the vertical distance between the position of the head of the person and the position of the feet of the person. Motion analysis application 112(1) scales the pre-generated 3D model based on one or more computed body dimensions of the person. Any technically feasible techniques or algorithms for computing one or more body dimension based on data indicating the positions of different joints and/or body parts can be used.

In some embodiments, if motion data 110(1) does not include sufficient information for motion analysis application 112(1) to compute a size or height of a person, then motion analysis application 112(1) generates a virtual avatar based on the pre-generated 3D model without scaling the 3D model. For example, if motion data 110(1) indicates only positions and orientations for each person, then motion analysis application 112(1) could determine that motion data 110(1) does not include sufficient information to compute a size or height for each person.

After generating one or more virtual avatars, motion analysis application 112(1) determines, for each virtual avatar, a position and orientation within an ER environment of the virtual avatar. In some embodiments, to determine a position and orientation of a virtual avatar, motion analysis application 112(1) identifies a subset of motion data 110(1) associated with the person to which the virtual avatar corresponds and a specific time for which the position of the virtual avatar is being determined. Motion analysis application 112(1) determines, based on the subset of motion data 110(1), the position within a 3D space and the orientation within the 3D space of the corresponding person at the specific time. Motion analysis application 112(1) positions and orients the virtual avatar within the ER environment according to the position and orientation within the 3D space of the corresponding person. When displayed within the ER environment, the position and orientation of the virtual avatar reflects the position and orientation of the corresponding person at the specific time.

In some embodiments, the position of each avatar indicated by motion data 110(1) is based on a coordinate system that was used to capture or generate the motion data 110(1). If the coordinate system associated with motion data 110(1) is different from the coordinate system associated with the ER environment (i.e., if the origin of one coordinate system corresponds to a different location within a 3D environment than the origin of the other coordinate system), determining the position of a person within the ER environment includes aligning the motion data 110(1) with the ER environment. Aligning the motion data 110(1) includes, for example, shifting or offsetting the location(s) indicated by motion data 110(1) along one or more axis.

In some embodiments, motion analysis application 112(1) receives user input indicating an amount, for a given axis, to shift or offset motion data 110(1). In some embodiments, motion analysis application 112(1) displays the one or more avatars within the ER environment without aligning motion data 110(1) to the ER environment. Motion analysis application 112(1) updates the display of the one or more avatars within the ER environment in response to receiving user input indicating that the one or more avatars should be shifted in a given direction. Additionally, motion analysis application 112(1) could store alignment data indicating an amount of shift or offset for each axis, and use the alignment data when determining locations for displaying avatars or other visualizations based on motion data 110(1).

In some embodiments, motion analysis application 112(1) receives data indicating locations of one or more features within the ER environment, for example, from the one or more cameras 128. Motion analysis application 112(1) analyzes the data to determine the amount(s) of shift or offset to apply to motion data 110(1). For example, motion analysis application 112(1) could determine the amount of shift or offset needed to align the locations of the one or more features within the ER environment with the locations of one or more corresponding features Additionally, in some embodiments, motion analysis application 112(1) determines, based on the subset of motion data 110(1), a pose of the corresponding person at the specific time. As referred to herein, a "pose" corresponds to the overall posture of the person, such as the position and orientation of the head, torso, and limbs of the person. Determining the pose of a person includes, for example, determining a position and orientation of different joints and/or body parts of the person. Motion analysis application 112(1) positions and orients each joint or body part of the virtual avatar according to the position and orientation of the corresponding joint or body part of the person. The number and type of joints and/or body parts whose position and orientation can be determined varies depending on the information included in motion data 110(1).

Motion analysis application 112(1) displays one or more avatars within a 3D environment, such as within AR scene 124, based on the determined position, orientation, and/or pose. In some embodiments, motion analysis application 112(1) displays the one or more avatars based on the amount and type of information available in motion data 110(1). For example, if motion data 110(1) did not include sufficient information for motion analysis application 112(1) to determine a pose for a person, then motion analysis application 112(1) displays the one or more avatars within the 3D environment based on the position and orientation of the person. As another example, if motion data 110(1) includes sufficient information to determine a position and orientation of one or more joints and/or body parts of a person but not other joints and/or body parts, then motion analysis application 112(1) could display the one or more joints and/or body parts with the determined position and orientation.

In some embodiments, if motion data 110(1) does not include sufficient information to determine a position of a joint or body part of a person, motion analysis application 112(1) estimates a position of the joint or body part based on the positions of other joints or body parts of the person. In some embodiments, if motion data 110(1) does not include sufficient information to determine the position of a joint or body part and/or does not include sufficient information to estimate the position of the joints or body part, then motion analysis application 112(1) generates an avatar of the person that does not include the specific joint or body part. For example, if motion data 110(1) did not include data for the legs and feet of a person, motion analysis application 112(1) could generate an avatar of the person that includes just the torso or upper body.

In some embodiments, if motion data 110(1) does not include sufficient information to determine an orientation of a person, motion analysis application 112(1) could generate an avatar or other visualization of the person that indicates only the position of the person.

In some embodiments, displaying an avatar in a 3D environment includes determining whether any portion of the avatar is occluded by elements of the 3D environment, such as walls or objects. If a portion of the avatar is occluded, then the occluded portion of the avatar is not displayed in the 3D environment. Determining whether to occlude a portion of an avatar can be based on a current point of view of the user. As the point of view of the user changes, motion analysis application 112(1) determines whether portions of the avatar are occluded based on the updated point of view and updates the display of the avatar accordingly. In some embodiments, motion analysis application 112(1) receives or generates a 3D model of the 3D environment. The 3D model could be, for example and without limitation, manually created, extracted from an existing building information modeling (BIM) system, generated based on captured sensor data such as images, video, LIDAR, and/or the like. Motion analysis application 112(1) determines whether any portion of the avatar is occluded by elements of the 3D environment based on the 3D model of the 3D environment. In some embodiments, motion analysis application 112(1) receives sensor data associated with the 3D environment, such as images or video captured by cameras 128. Motion analysis application 112(1) analyzes the sensor data to identify features within the 3D environment and determines whether any portion of the avatar is occluded based on the position of the avatar and the locations of the identified features within the 3D environment.

Figure 2:
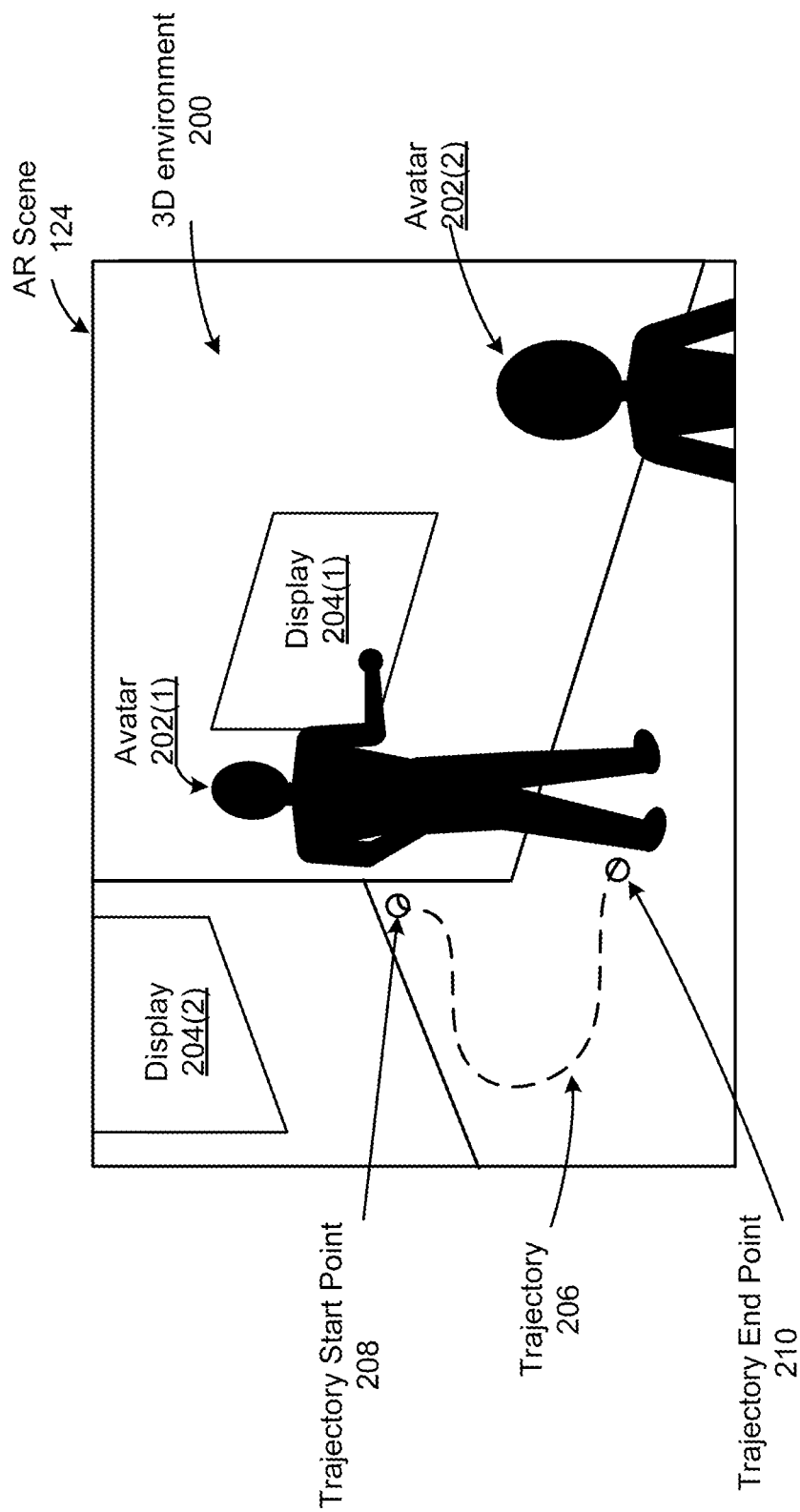
FIG. 2 is an illustration of an exemplar AR scene, according to various embodiments.

FIG. 2 is an illustration of an exemplar AR scene 124, according to various embodiments. AR scene 124 displays a 3D augmented environment 200. The 3D augmented environment 200 is a real-world physical environment that includes one or more real-world objects, such as display 204(1) and 204(2), as well as one or more virtual objects, such as avatar 202(1), avatar 202(2), and trajectory 206. The one or more virtual objects are displayed in conjunction with the one or more real-world objects within the real-world environment.

The view or perspective of 3D augmented environment 200 that is shown in AR scene 124 is based on a current viewpoint and location within the real-world environment of the user of AR computing device 102. Motion analysis application 112(1) determines, based on the current viewpoint and location of the user, the portion of 3D augmented environment 200, as well as the real-world objects and virtual objects, to display in AR scene 124. Motion analysis application 112(1) causes the portion of 3D augmented environment 200 to be displayed within AR scene 124. As the current viewpoint of the user changes, for example due to the user turning their head or moving within the real-world environment, motion analysis application 112(1) updates the view or perspective of 3D augmented environment 200 displayed within AR scene 124 accordingly. Therefore, in AR scene 124, a user is able to view virtual objects, such as avatar 202(1) and avatar 202(2), from multiple different viewpoints and in conjunction with the real-world environment and real-world objects within the real-world environment.

Avatar 202(1) corresponds to a first person whose movements were captured in motion data 110(1). Avatar 202(2) corresponds to a second person whose movements were captured in motion data 110(1). In some embodiments, avatar 202(1) is displayed within AR scene 124 using a color associated with the first person and avatar 202(2) is displayed within the AR scene 124 using a color associated with the second person.

As shown in FIG. 2, avatar 202(1) is displayed at a position within 3D augmented environment 200 that corresponds to the position of the first person within a 3D space at a first point in time and with an orientation within 3D augmented environment 200 that corresponds to the orientation of the first person at the first point in time. Avatar 202(2) is displayed at a position within 3D augmented environment 200 that corresponds to the position of the second person within a 3D space at a second point in time and with an orientation within 3D augmented environment 200 that corresponds to the orientation of the second person at the second point in time. Additionally, as shown in FIG. 2, avatar 202(1) is displayed with a pose corresponding to the pose of the first person at the first point in time. The position of one or more joints and/or one or more body parts of avatar 202(1) corresponds to the position of the one or more joints and/or the one or more body parts of the first person at the first point in time. Similarly, avatar 202(2) is displayed with a pose corresponding to the pose of the second person at the second point in time. The position of one or more joints and/or one or more body parts of avatar 202(2) corresponds to the position of the one or more joints and/or the one or more body parts of the second person at the second point in time.

The first point in time and the second point in time can be the same point in time or can be different points in time. For example, a user could view movements of all virtual avatars in sync, such that each virtual avatars displayed within AR scene 124 reflect the position, orientation, and pose of a corresponding person at the same point in time. If the user "plays" the movements and increments the point in time, then each virtual avatar is updated to reflect the position, orientation, and pose of the corresponding person at the incremented point in time. A user could also "pin" a given virtual avatar such that the virtual avatar reflects the position, orientation, and pose of the corresponding person at the current point in time. If the user changes the point in time, the position, orientation, and pose of other virtual avatars could be updated while the pinned virtual avatar maintains the same position, orientation, and pose.

In various embodiments, the one or more data visualizations 114(1) further include one or more visualizations associated with a virtual avatar displayed within an ER environment, such as within AR scene 124. The one or more visualizations associated with a virtual avatar could include, for example, trajectories, ghost visualizations, specter visualizations, gaze visualizations, touch visualizations, footprint visualizations, and other types of visualizations associated with movements of the corresponding person and/or interactions of the corresponding person with real-world objects, virtual objects, or other people.

In various embodiments, the one or more data visualizations 114(1) include, for one or more people whose movements were captured in motion data 110(1), one or more trajectories corresponding to each person. Each trajectory visually represents the location(s) that the person was at over a given period of time. The period of time could be, for example, the full length of time in which the person was in the 3D space that was captured in motion data 110(1) or a portion of the full length of time.

A trajectory could be any suitable two-dimensional (2D) or three-dimensional (3D) shape or set of shapes that can be used to visually represent locations over time. For example, a trajectory could include one or more 2D line(s) representing path(s) within the ER environment, one or more 3D tube(s) representing the path(s) within the ER environment, a set of 2D circles or other type of 2D shapes representing different locations within the ER environment, a set of 3D spheres or other type of 3D volumes representing different locations within the ER environment and the like.

In some embodiments, to generate a trajectory for a person, motion analysis application 112(1) identifies a subset of motion data 110(1) corresponding to the person. Additionally, if the trajectory is for a given period of time, motion analysis application 112(1) identifies a subset of motion data 110(1) corresponding to the person that is within the given period of time. Motion analysis application 112(1) determines a plurality of locations that the person was at based on the subset of motion data 110(1). Additionally, in some embodiments, motion analysis application 112(1) determines an order associated with the plurality of locations. Motion analysis application 112(1) generates one or more 2D objects and/or one or more 3D objects representing the plurality of locations. The one or more 2D objects and/or one or more 3D objects are displayed within an ER environment based on the plurality of locations.

In some embodiments, a trajectory includes a 3D tube that indicates a path traveled by the corresponding person. Motion analysis application 112(1) generates a portion of the 3D tube at each location included in the plurality of locations. Additionally, for each location, motion analysis application 112(1) determines a direction of travel of the person based on the preceding location and/or subsequent location. Motion analysis application 112(1) positions each portion of the 3D tube based on the direction of travel. Motion analysis application 112(1) connects the portions of the 3D tube to form a completed trajectory.

In some embodiments, a trajectory includes a set of 2D lines that indicate a path traveled by the corresponding person. Motion analysis application 112(1) generates a vertex at each location included in the plurality of locations. Motion analysis application 112(1) connects the vertices based on an order of the plurality of locations to form a completed trajectory.

Referring to FIG. 2, AR scene 124 includes a trajectory 206. Trajectory 206 corresponds to avatar 202(1) and represents locations within environment 200 that the person corresponding to avatar 202(1) was located at during a period of time. As shown in FIG. 2, the period of time associated with trajectory 206 starts at a first point in time associated with trajectory start point 208 and ends at a second point in time associated with trajectory end point 210. Trajectory 206 visually represents different locations within environment 200 that the corresponding person was at during the period of time. Although FIG. 2 illustrates trajectory 206 as a dotted line, as discussed above, trajectory 206 can be any suitable 2D or 3D object(s). In some embodiments, trajectory 206 is displayed within AR scene 124 using a color associated with the person corresponding to avatar 202(1). If multiple trajectories were displayed within AR scene 124, then the color could be used to identify which trajectory corresponds to which virtual avatar.

In various embodiments, the one or more data visualizations 114(1) include, for a virtual avatar displayed within an AR scene 124, a ghost visualization corresponding to the virtual avatar. A ghost visualization includes a second virtual avatar that represents a position and orientation of the corresponding person at a different location and/or a different point in time from the virtual avatar. Additionally, the second virtual avatar included in the ghost visualization could represent a pose of the corresponding person at the different point in time. Accordingly, the ghost visualization can be used, in conjunction with the virtual avatar, to compare the position, orientation, and/or pose of a person at two different points in time.

In some embodiments, motion analysis application 112(1) receives a request to generate a ghost visualization corresponding to a person at a specific location. Motion analysis application 112(1) identifies a subset of motion data 110(1) that corresponds to the person and indicate that the person was at the specific location. Motion analysis application 112(1) determines, based on the subset of motion data 110(1), an orientation of the person at the point in time corresponding to the specific location. Motion analysis application 112(1) generates a second virtual avatar corresponding to the person. Motion analysis application 112(1) positions the second virtual avatar at the specific location and with the corresponding orientation. Additionally, if the subset of motion data 110(1) indicates the position and orientation of one or more joints and/or one or more body parts of the person, then motion analysis application 112(1) positions and orients each joint or body part of the second virtual avatar according to the position and orientation of the corresponding joint or body part of the person.

In some embodiments, motion analysis application 112(1) receives a request to generate a ghost visualization corresponding to a person at a specific point in time. Motion analysis application 112(1) identifies a subset of motion data 110(1) that corresponds to the person and the specific point in time. Motion analysis application 112(1) determines, based on the subset of motion data 110(1), a position of the person at the specific point in time and an orientation of the person at the specific point in time. Motion analysis application 112(1) generates a second virtual avatar corresponding to the person. Motion analysis application 112(1) positions and orients the second virtual avatar according to the position and orientation of the person at the specific point in time, respectively. Additionally, if the subset of motion data 110(1) indicates the position and orientation of one or more joints and/or one or more body parts of the person, then motion analysis application 112(1) positions and orients each joint or body part of the second virtual avatar according to the position and orientation of the corresponding joint or body part of the person.

Figure 3A:
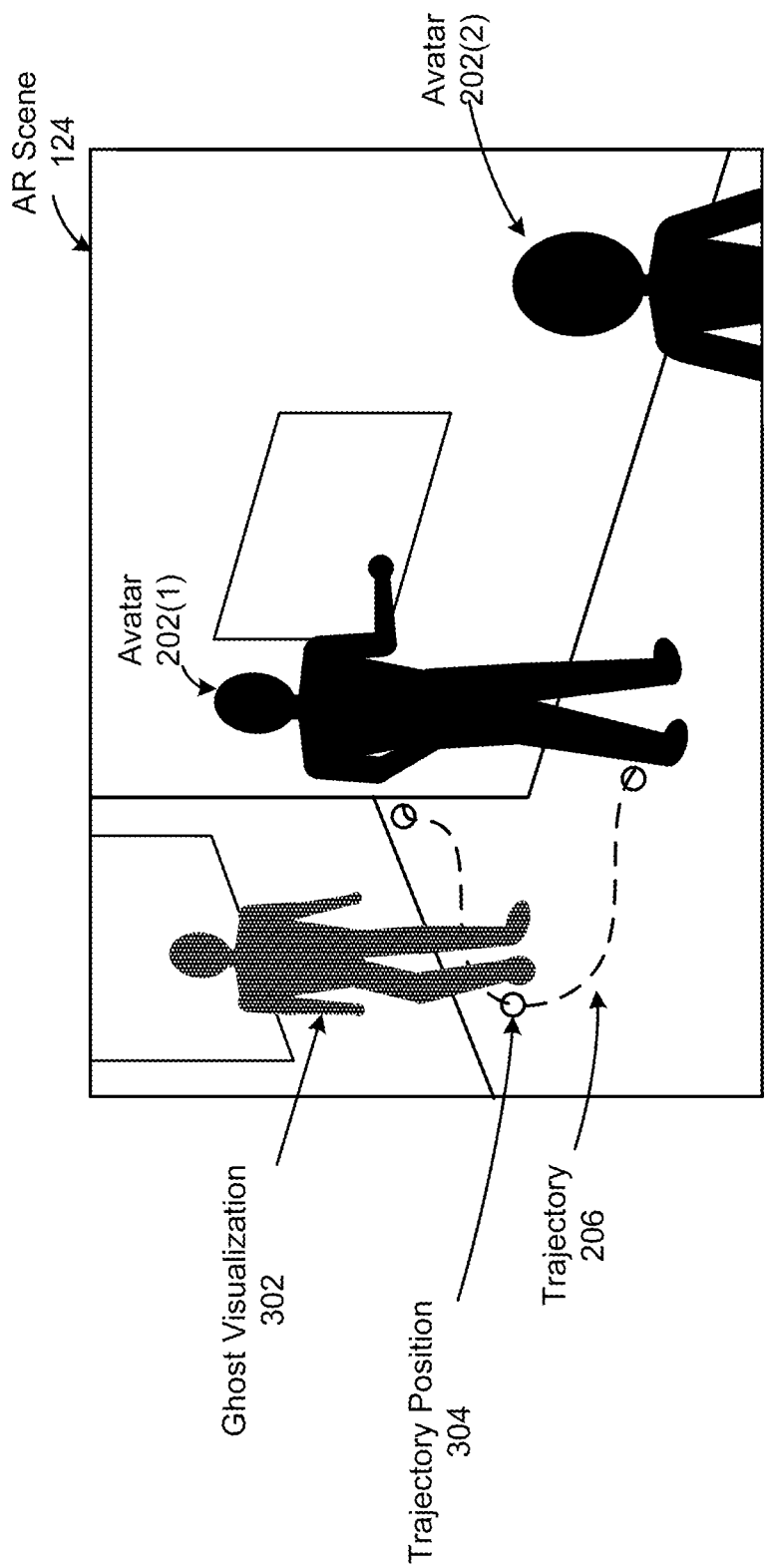
FIG. 3A illustrates an exemplar ghost visualization, according to various embodiments.

FIG. 3A illustrates an exemplar ghost visualization 302, according to various embodiments. As shown in FIG. 3A, AR scene 124 includes a ghost visualization 302 corresponding to avatar 202(1). Ghost visualization 302 represents a position, orientation, and pose of the person corresponding to avatar 202(1) at a point in time when the person was at trajectory position 304 along trajectory 206. In some embodiments, ghost visualization 302 is displayed within AR scene 124 using a color associated with the person corresponding to avatar 202(1). In some embodiments, ghost visualization 302 is displayed with a different opacity (amount of transparency) than avatar 202(1). For example, avatar 202(1) could be fully opaque while the virtual avatar included in ghost visualization 302 could be semi-transparent.

In various embodiments, the one or more data visualizations 114(1) include, for a virtual avatar displayed within an AR scene 124, a specter visualization corresponding to the virtual avatar. A specter visualization includes a set of additional virtual avatars, where each additional virtual avatar represents the position and orientation of the corresponding person at a different point in time for a given period of time. Additionally, each additional virtual avatar included in the specter visualization could represent a post of the corresponding person at the different point in time. Additionally, the specter visualization can be used to view the change in position, orientation, and/or pose of a person over a period of time.

In some embodiments, motion analysis application 112(1) is configured to generate a specter visualization corresponding to a period of time that immediately precedes the point in time associated with the virtual avatar. In some embodiments, motion analysis application 112(1) is configured to generate a specter visualization corresponding to a period of time that immediately follows the point in time associated with the virtual avatar. In some embodiments, motion analysis application 112(1) is configured to generate a specter visualization corresponding to a period of time that includes the period of time that immediately precedes the point in time associated with the virtual avatar and the period of time that immediately follows the point in time associated with the virtual avatar.

In some embodiments, motion analysis application 112(1) receives a request to generate a specter visualization corresponding to a person for a given period of time. Motion analysis application 112(1) identifies a subset of motion data 110(1) that corresponds to the person and was captured within the given period of time. In some embodiments, motion analysis application 112(1) divides the given period of time into a plurality of intervals and generates an additional virtual avatar corresponding to each interval of time. For example, if a period of time is ten minutes, motion analysis application 112(1) could divide the period of time into ten one-minute intervals and generate a virtual avatar corresponding to each one-minute interval. In some embodiments, motion analysis application 112(1) generates an additional virtual avatar for each point in time within the given period of time for which the subset of motion data 110(1) has corresponding data. For example, if motion data 110(1) has position and orientation data for each person at ten-second intervals, then motion analysis application 112(1) would generate a virtual avatar for each ten-second interval. If motion data 110(1) has position and orientation data for each person at thirty-second intervals, then motion analysis application 112(1) would generate a virtual avatar for each thirty-second interval.

In some embodiments, motion analysis application 112(1) receives a request to generate a specter visualization corresponding to a person for a given number of intervals of time before and/or after a current point in time. Motion analysis application 112(1) computes a period of time corresponding to the specter visualization based on the number of intervals of time and whether the intervals of time are before or after the current point in time. Motion analysis application 112(1) identifies a subset of motion data 110(1) that corresponds to the person and the computed period of time. Motion analysis application 112(1) generates an additional virtual avatar for each interval of time based on the subset of motion data 110(1). For example, if motion analysis application 112(1) receives a request to generate a specter visualization corresponding to five one-minute intervals before a current point in time, then specter visualization generates a first additional virtual avatar corresponding to one minute prior to the current point in time, a second additional virtual avatar corresponding to two minutes prior to the current point in time, and so on.

In some embodiments, to generate an additional virtual avatar for a specter visualization, motion analysis application 112(1) determines a point in time that corresponds to the additional virtual avatar. Motion analysis application 112(1) determines, based on a subset of motion data 110(1), a position of the person at the point in time and an orientation of the person at the point in time. Motion analysis application 112(1) generates an additional virtual avatar corresponding to the person. Motion analysis application 112(1) positions and orients the additional virtual avatar according to the position and orientation of the person at the point in time, respectively. Additionally, if the subset of motion data 110(1) indicates the position and orientation of one or more joints and/or one or more body parts of the person, then motion analysis application 112(1) positions and orients each joint or body part of the additional virtual avatar according to the position and orientation of the corresponding joint or body part of the person.

Figure 3B:
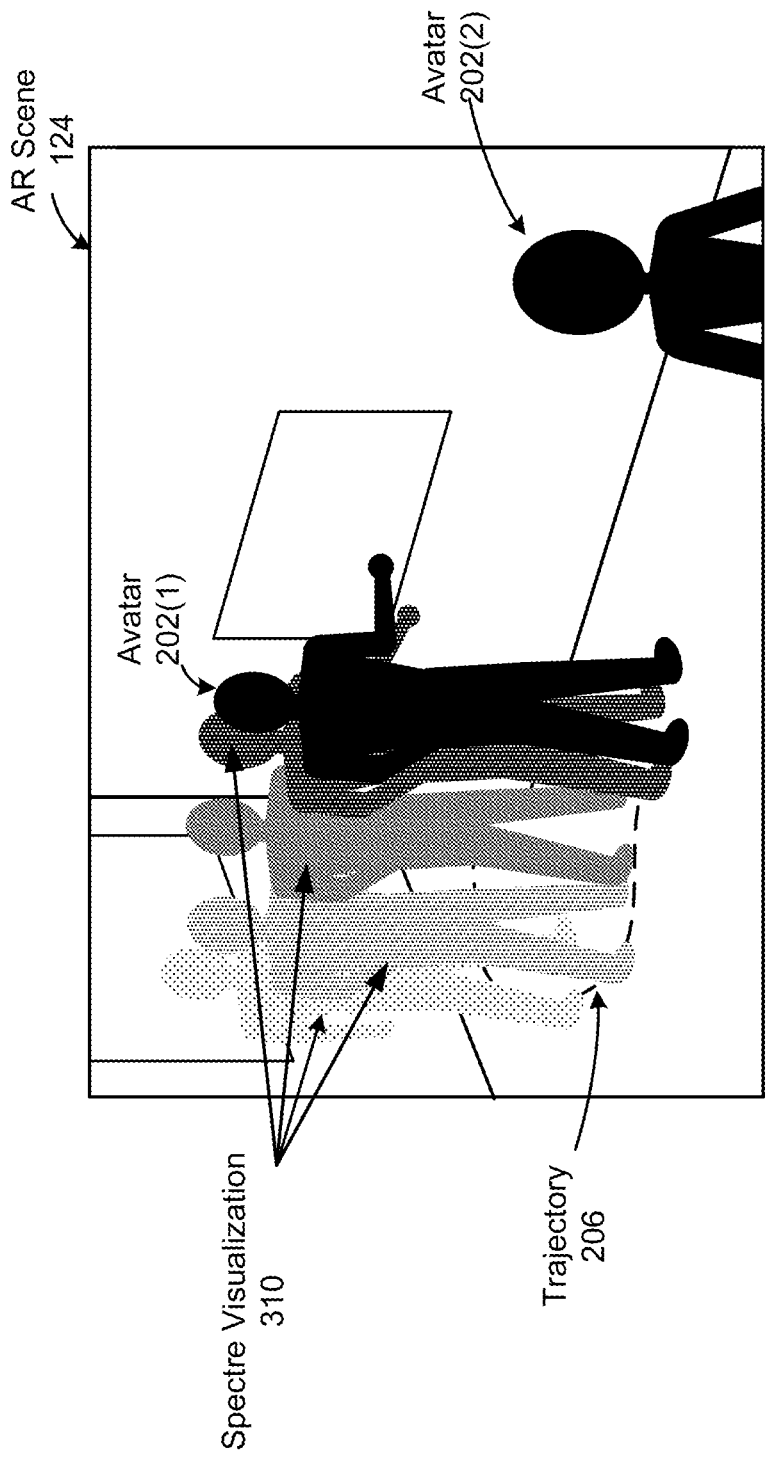
FIG. 3B illustrates an exemplar specter visualization, according to various embodiments.

FIG. 3B illustrates an exemplar specter visualization 310, according to various embodiments. As shown in FIG. 3B, AR scene 124 includes a specter visualization 310 corresponding to avatar 202(1). Specter visualization 310 includes multiple virtual avatars, where each virtual avatar represents a position, orientation, and pose of the person corresponding to avatar 202(1) at a different point in time along trajectory 206. In some embodiments, specter visualization 310 is displayed within AR scene 124 using a color associated with the person corresponding to avatar 202(1). In some embodiments, specter visualization 310 is displayed with a different opacity (amount of transparency) than avatar 202(1). For example, avatar 202(1) could be fully opaque while each virtual avatar included in specter visualization 310 could be semi-transparent. As shown in FIG. 3B, the corresponding person was walking along trajectory 206, resulting in the multiple virtual avatars of specter visualization 310 being positioned at different locations in AR scene 124. Accordingly, each virtual avatar would appear semi-transparent in AR scene 124. However, if a person was stationary during the period of time corresponding to specter visualization 310, then the multiple virtual avatars of specter visualization 310 would overlap, resulting in the multiple virtual avatars having a more opaque appearance in AR scene 124.

In various embodiments, the one or more data visualizations 114(1) include, for a virtual avatar displayed within an AR scene 124, a gaze visualization corresponding to the virtual avatar. A gaze visualization visually represents one or more elements of the ER environment, or portions of one or more elements, where the corresponding person was looking at the corresponding point in time. The one or more elements of the ER environment could be, for example, portions of the ER environment itself, real-world objects displayed within the ER environment, and/or virtual avatars representing other people that were near the corresponding person (e.g., within the same room or portion of a 3D environment) at the current point in time. Accordingly, the gaze visualization can be used to determine what element(s) a person was looking at, what element(s) the person could see, and what element(s) the person could not see when the person was in the position and orientation (and optionally, the pose) of the virtual avatar. Multiple gaze visualizations could be used, for example, to determine if multiple people were viewing the same element(s). Additionally, one or more gaze visualizations could be used to determine if any portion of an element was obstructed from view, too high, too low, or otherwise not visible to one or more corresponding people.

In some embodiments, to generate a gaze visualization for a person, motion analysis application 112(1) determines a location of the eyes of the person. Motion analysis application 112(1) generates a plurality of rays that extend outwards from the location of the eyes of the person towards the ER environment. The directions of the plurality of rays are constrained to a field of view of the person. In some embodiments, the directions of the plurality of rays are constrained to a smaller degree within the field of view (e.g., 10 degrees) that corresponds to a visual focus area. In such cases, the gaze visualization highlights only what a person is visually focused on rather than anything that the person is able to see.

In some embodiments, if motion data 110(1) indicates the position of the eyes of each person, then motion analysis application 112(1) determines a location of the eyes of the person based on motion data 110(1). Motion analysis application 112(1) identifies a subset of motion data 110(1) corresponding to the person and the current point in time associated with the virtual avatar of the person. Motion analysis application 112(1) determines, based on the subset of motion data 110(1), the location of the eyes of the person at the current point in time. Additionally, if motion data 110(1) indicates a direction in which the person is looking, then motion analysis application 112(1) could generate the plurality of rays based on the direction. If motion data 110(1) does not indicate the position of the eyes of each person, or if the subset of motion data 110(1) does not indicate the position of the eyes of the person at the current time, then motion analysis application 112(1) estimates the location of the eyes of the person based on the position and orientation of the head of the avatar.

In some embodiments, if one or more rays intersects with an element of the ER environment, motion analysis application 112(1) determines that the person was looking at the element of the ER environment. In other embodiments, if a threshold number of rays intersect with the element of the ER environment, then motion analysis application 112(1) determines that the person was looking at the element of the ER environment. The threshold number could be, for example, a specific number or a specific percentage of the plurality of rays.

Motion analysis application 112(1) generates a virtual object corresponding to the element of the ER environment. As discussed above, an element of the ER environment could be a portion of the ER environment itself (e.g., floor, wall, door, window), a real-world object included in the ER environment, or a virtual object (e.g., a virtual avatar representing another person within the ER environment). The virtual object can include any suitable 2D or 3D shape, or set of 2D and/or 3D shapes, that can be used to visually highlight the element of the ER environment. The virtual object could vary depending on the element at which a person is looking. For example, if the element is a 2D element, motion analysis application 112(1) could generate a 2D outline of the element or a 2D shape corresponding to the shape of the element, and if the element is a 3D element, motion analysis application 112(1) could generate a 3D outline of the element or a 3D volume corresponding to the shape of the element.

In some embodiments, motion analysis application 112(1) generates a virtual object at each position where a ray intersects with an element of the ER environment. The virtual object could be any suitable 2D or 3D object that indicates an intersection location. In some embodiments, motion analysis application 112(1) generates a sphere at each position where a ray intersects with an element of the ER environment. Accordingly, each sphere corresponds to an intersection between the line of sight of the person and an element of the ER environment.

Figure 3C:
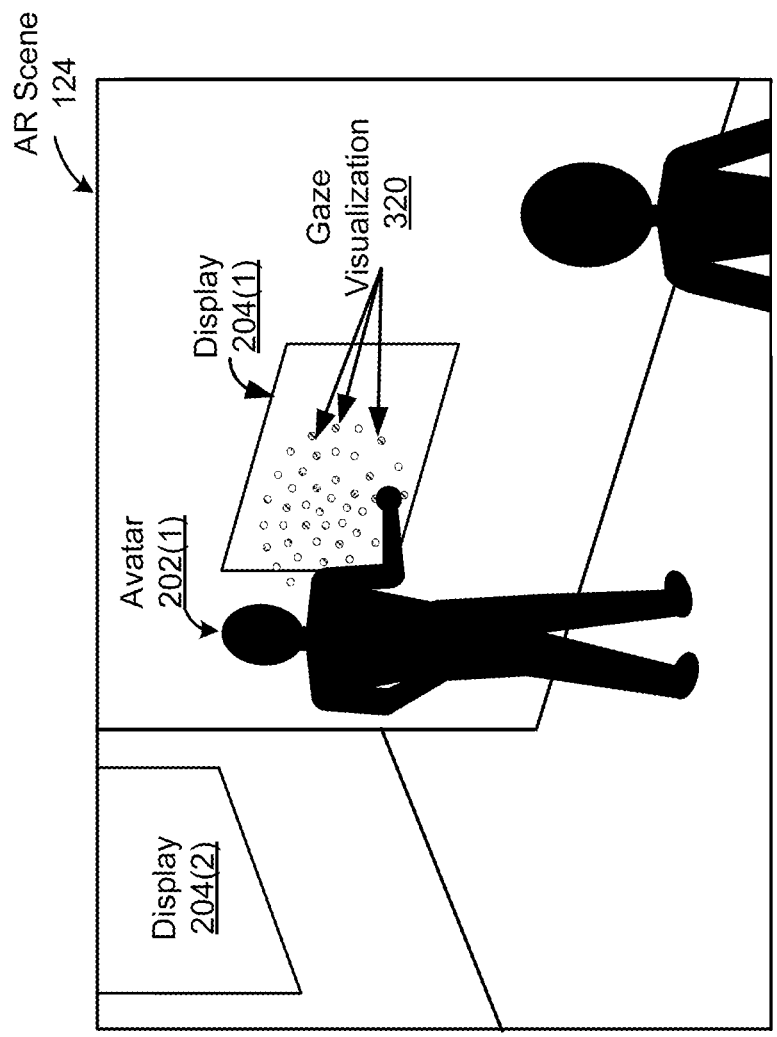
FIG. 3C illustrates an exemplar gaze visualization, according to various embodiments.

FIG. 3C illustrates an exemplar gaze visualization 320, according to various embodiments. As shown in FIG. 3C, AR scene 124 includes a gaze visualization 320 corresponding to avatar 202(1). Gaze visualization 320 includes multiple spheres that highlight the different locations within environment 200 that the person corresponding to avatar 202(1) is viewing. Each sphere corresponds to a position at which a ray that extends outwards from an eye of avatar 202(1) intersects with the environment 200, such as a wall included in environment 200 and portions of display 204(1). In some embodiments, gaze visualization 320 is displayed within AR scene 124 using a color associated with the person corresponding to avatar 202(1). If multiple gaze visualizations were displayed within AR scene 124, then the color could be used to identify which gaze visualization corresponds to which virtual avatar.

In some embodiments, if the position, orientation, or pose of a virtual avatar changes, then the motion analysis application 112(1) updates the gaze visualization corresponding to the virtual avatar. For example, if the position, orientation, and/or pose of avatar 202(1) changes, then motion analysis application 112(1) generates an updated gaze visualization 320 based on the updated position, orientation, and/or pose, whichever the case may be.

In various embodiments, the one or more data visualizations 114(1) include, for a virtual avatar displayed within an AR scene 124, a touch visualization corresponding to the virtual avatar. A touch visualization visually represents one or more elements of the ER environment, or portions of the one or more elements, that the corresponding person was touching at the corresponding point in time. Accordingly, the touch visualization can be used to determine what element(s) a person was physically interacting with when the person was in the position and orientation (and optionally, the pose) of the virtual avatar. Multiple touch visualizations could be used, for example, to determine if multiple people were physically interacting with the same element(s).

In some embodiments, to generate a touch visualization for a person, motion analysis application 112(1) determines a position of each hand and/or each finger of each hand of the person at the current point in time associated with the virtual avatar. In some embodiments, motion analysis application 112(1) determines the location of each hand based on the location of each hand of the virtual avatar. Additionally, in some embodiments, motion analysis application 112(1) determines the location of each finger of each hand based on the location of the corresponding finger of the virtual avatar. Motion analysis application 112(1) determines, based on the position of each hand and/or each finger of each hand whether the person is touching or contacting one or more elements of the ER environment. In some embodiments, motion analysis application 112(1) determines whether each hand or finger is within a threshold distance of an element of the ER environment. In some embodiments, the threshold distance differs based on whether motion data 110(1) included data indicating the position of each finger of each person. If motion data 110(1) included data indicating the position of each finger of each person, then the virtual avatar would be posed according to the finger positions indicated by motion data 110(1). In such cases, the finger positions of the virtual avatar more accurately reflect the finger positions of the corresponding person, and a smaller threshold distance is used. If motion data 110(1) did not indicate finger positions, then the finger positions of the virtual avatar do not reflect the finger positions of the corresponding person. In such cases, a larger threshold distance is used. Additionally, motion analysis application 112(1) could determines a position and orientation of each hand of the person and determine, based on the position and orientation of the hand, whether a person was likely touching an element of the ER environment when the element of the ER environment is within the threshold distance. For example, if the hand of the virtual avatar is within a threshold distance of a real-world object but the hand is angled away from the real-world object, then motion analysis application 112(1) would determine that the person is not touching the real-world object.

Motion analysis application 112(1) generates a virtual object corresponding to the element of the ER environment. The virtual object can include any suitable 2D or 3D shape, or set of 2D and/or 3D shapes, that can be used to visually highlight the element of the ER environment. The virtual object could vary depending on the element at which a person is looking. For example, if the element is a 2D element, motion analysis application 112(1) could generate a 2D outline of the element or a 2D shape corresponding to the shape of the element, and if the element is a 3D element, motion analysis application 112(1) could generate a 3D outline of the element or a 3D volume corresponding to the shape of the element. In some embodiments, the virtual object indicates the location on the element that the person is in contact with, rather than the entire element. The virtual object could be any suitable 2D or 3D shape for indicating a point of contact. In some embodiments, motion analysis application 112(1) generates a sphere at the location in the ER environment where the person is contacting an element of the ER environment.

In some embodiments, motion analysis application 112(1) generates a touch visualization corresponding to a person at given point in time, such as the current point in time associated with a virtual avatar of the person. In some embodiments, motion analysis application 112(1) generates a touch visualization for a person for a period of time. Motion analysis application 112(1) identifies a subset of motion data 110(1) that corresponds to the person. Motion analysis application 112(1) determines, based on the subset of motion data 110(1), locations of each hand and/or each finger of each hand of the person at different times. Motion analysis application 112(1) determines, based on the position of each hand and/or each finger of each hand whether the person is touching or contacting one or more elements of the ER environment at any of the different times. Determining whether the person is touching or contacting an element of the ER environment is performed in a manner similar to that discussed above with respect to generating a touch visualization corresponding to a single point in time. In some embodiments, motion analysis application 112(1) generates a virtual object corresponding to each element of the ER environment that the person touches or contacts during the period of time. In some embodiments, motion analysis application 112(1) generates a virtual object corresponding to each point of contact of the person with an element of the ER environment. Additionally, in some embodiments, if the person is within the threshold distance with the point of contact throughout a length of time (e.g., over multiple consecutive points in time) motion analysis application 112(1) does not generate additional virtual objects for the point of contact until after a point in time at which the threshold distance is exceeded.

Figure 3D:
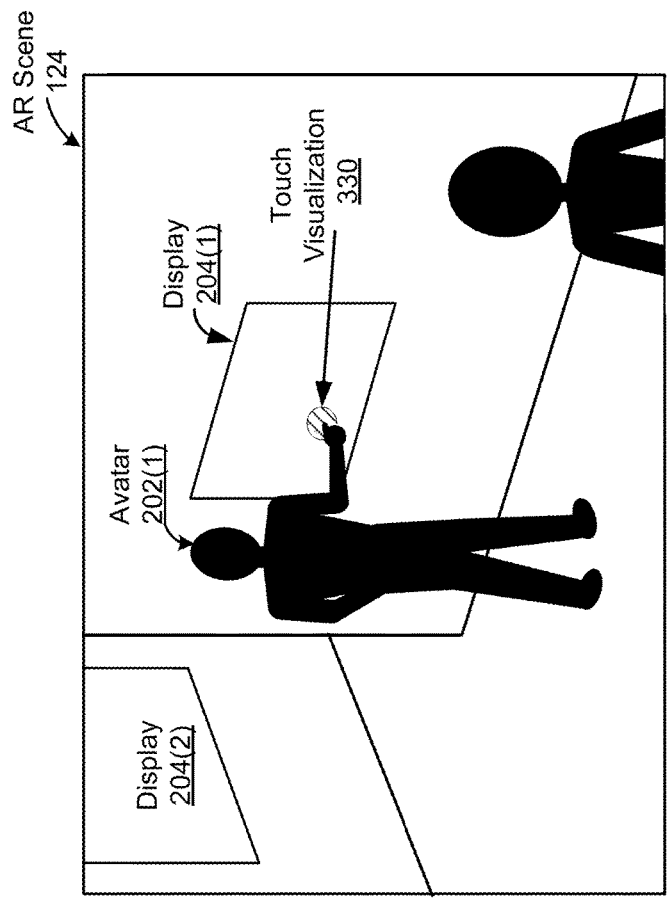
FIG. 3D illustrates an exemplar touch visualization, according to various embodiments.

FIG. 3D illustrates an exemplar touch visualization 330, according to various embodiments. As shown in FIG. 3D, AR scene 124 includes a touch visualization 330 corresponding to avatar 202(1). Touch visualization 330 includes a circle that indicates a location on display 204(1) that the person corresponding to avatar 202(1) is touching or is predicted by motion analysis application 112(1) to be touching. In some embodiments, touch visualization 330 is displayed within AR scene 124 with a color associated with the person corresponding to avatar 202(1). In some embodiments, each touch visualization 330 is associated with the point in time at which the corresponding person touched or contacted that portion of environment 200. The point in time could be displayed as part of each touch visualization 330. Accordingly, if multiple touch visualizations 330 corresponding to avatar 202(1) were displayed within AR scene 124, then the point in time could be used to identify when the person interacted with that portion of environment 200.

In various embodiments, the one or more data visualizations 114(1) include, for a virtual avatar displayed within an AR scene 124, a footprint visualization corresponding to the virtual avatar. A footprint visualization visually represents the footsteps of a person on the ground over a period of time. Each footstep represented by a footprint visualization indicates a location where a foot of the person touched the ground and the direction in which the person was moving. Accordingly, the footprint visualization can be used to determine how quickly a person was moving during the period of time in addition to the path that the person traveled during the period of time. The period of time could be, for example, the full length of time in which the person was in the 3D space that was captured in motion data 110(1) or a portion of the full length of time.

In some embodiments, to generate a footprint visualization for a person, motion analysis application 112(1) identifies a subset of motion data 110(1) corresponding to the person. Additionally, if the footprint visualization is for a given period of time, motion analysis application 112(1) identifies the subset of motion data 110(1) corresponding to the person that is within the given period of time. Motion analysis application 112(1) determines a plurality of locations corresponding to each foot of the person based on the subset of motion data 110(1). Additionally, in some embodiments, motion analysis application 112(1) determines an order associated with the plurality of locations. Motion analysis application 112(1) determines, for each location corresponding to a foot of the person, whether the foot of the person was on the ground. If motion analysis application 112(1) determines that the foot of the person was on the ground, then motion analysis application 112(1) generates a virtual object corresponding to the foot of the person. The virtual object can include any suitable 2D or 3D shape, or set of 2D and/or 3D shapes, that can be used to visually represent the placement of the foot of the person on the ground, such as a 2D outline of a foot, a 2D image of a footprint or shoeprint, a 3D foot, and the like. In some embodiments, a size of the virtual object corresponds to a size of the foot. In some embodiments, motion analysis application 112(1) determines an orientation of the foot based on the subset of motion data 110(1) and orients the virtual object according to the orientation of the foot.

Figure 3E:
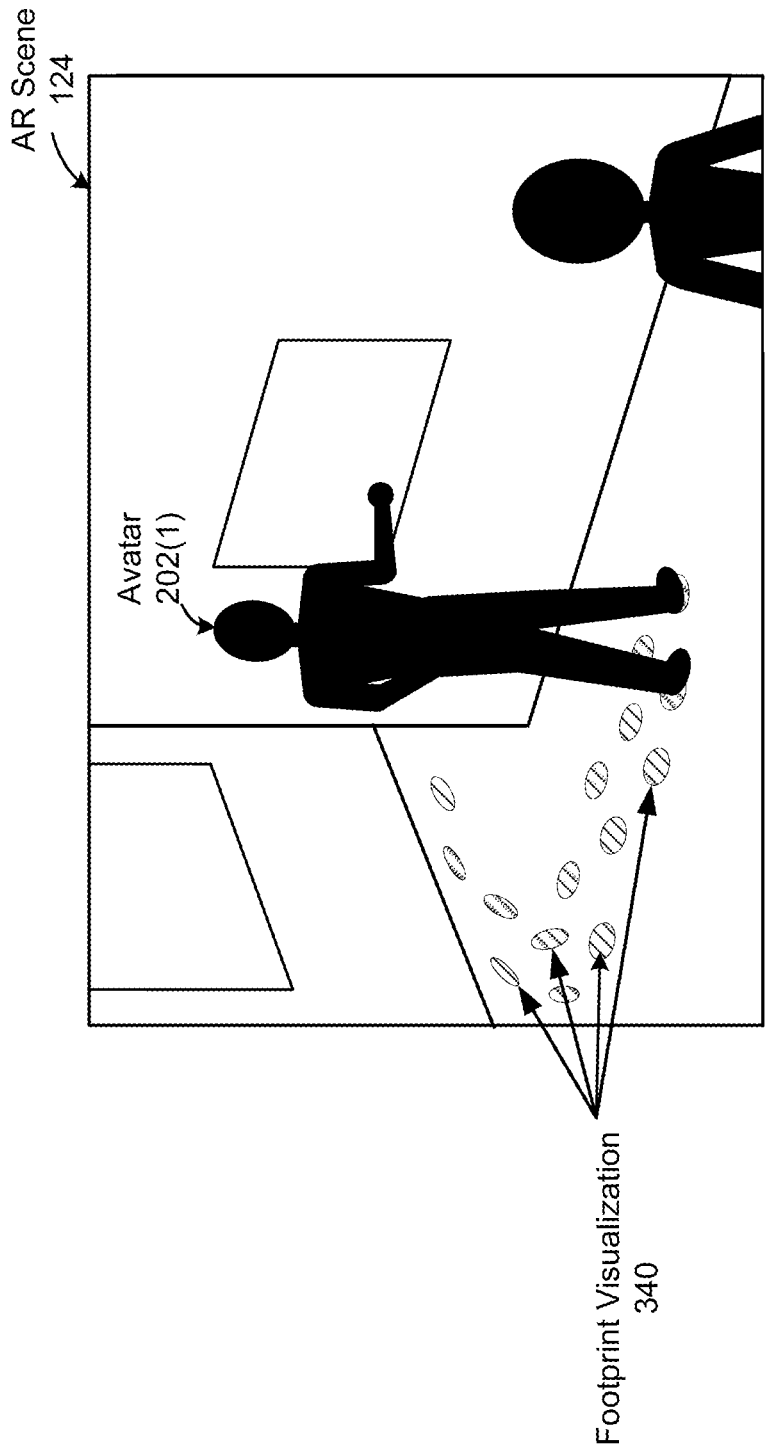
FIG. 3E illustrates an exemplar footprint visualization, according to various embodiments.

FIG. 3E illustrates an exemplar footprint visualization 340, according to various embodiments. As shown in FIG. 3E, AR scene 124 includes a footprint visualization 340 corresponding to avatar 202(1). Footprint visualization 340 includes a set of footprints that indicate locations on the floor of environment 200 that the person corresponding to avatar 202(1) stepped on. Additionally, each footprint indicates the orientation of the foot of the person when the person stepped on the corresponding location. In some embodiments, footprint visualization 340 is displayed within AR scene 124 using a color associated with the person corresponding to avatar 202(1). If multiple footprint visualizations were displayed for multiple different virtual avatars, then the color could be used to identify which footprint visualization corresponds to which avatar.

Although example data visualizations 114(1) are discussed above with respect to a virtual avatar and a person corresponding to the virtual avatar, a data visualization 114(1) can correspond to a specific body part of a person, such as the head, hand, arm, leg, foot, and so forth. For example, a trajectory could visually represent the location(s) that a specific body part was at over a given period of time. As another example, a ghost visualization could represent a position, orientation, and/or pose of a specific body part at a different location in the ER environment and/or at a different point in time. As a third example, a specter visualization could include multiple 3D models of the specific body part, where each 3D model represents the position, orientation, and/or pose of the specific body part at a different point in time for a given period of time. Generating the data visualization 114(1) for a specific body part of a person is performed in a manner similar to that discussed above with respect to trajectory 206, ghost visualization 302, and specter visualization 310.

In various embodiments, the one or more data visualizations 114(1) further include one or more visualizations associated with a set of people whose movements were captured in motion data 110(1). The one or more visualizations associated with the set of people could include, for example, a heatmap that indicates how much movement occurred in different areas of the ER environment, a heatmap that indicates how much people viewed different elements of the ER environment, a heatmap that indicates how much people touched or contacted different elements of the ER environment, a visualization that highlights the most and/or least frequently visited areas, a visualization that highlights the most and/or least frequently viewed elements of the ER environment, a visualization that highlights the most and/or least frequently touched elements of the ER environment, a visualization that indicates a number of people that were in a specific location, a visualization that indicates a number of people that viewed a specific element, a visualization that indicates a number of people that touched or contacted a specific element, and the like.

In various embodiments, the one or more data visualizations 114(1) can include more or fewer types of data visualizations than the ones discussed above. The data visualizations 114(1) may not include all the types of data visualizations described herein. Furthermore, the data visualizations 114(1) are not limited to the exemplar data visualizations 114(1) discussed above and can include data visualizations 114(1) not specifically described herein.

Interactive Motion Data Analysis

A user can interact with AR scene 124 using one or more input devices, such as AR controller(s) 126 or other input devices included in I/O devices 106. In some embodiments, interacting with one or more data visualizations 114(1) displayed within AR scene 124 causes motion analysis application 112(1) to update the one or more data visualizations 114(1), generate one or more additional data visualizations 114(1) for display in AR scene 124, and/or remove one or more data visualizations 114(1) from AR scene 124.

In some embodiments, selecting a virtual avatar displayed within AR scene 124 causes motion analysis application 112(1) to display, within AR scene 124, one or more commands associated with the virtual avatar. The one or more commands include, for example, commands for modifying the current time associated with the virtual avatar, starting playback of movement of the virtual avatar, stopping the playback of movement of the virtual avatar, and/or displaying additional data visualizations 114(1) associated with the virtual avatar, such as a trajectory, ghost visualization, specter visualization, gaze visualization, touch visualization, footprint visualization, and so forth. In some embodiments, the visualizations available for a virtual avatar varies based on the information associated with the corresponding person that is included in motion data 110(1). If motion data 110(1) does not include sufficient information to generate a given visualization, then the given visualization would not be available for the virtual avatar. For example, as explained above, a gaze visualization is generated based on motion data 110(1) indicating a position of the eyes of the corresponding person and/or the position of the head of the corresponding person at a given time. If the position of the eyes and/or head of the person cannot be determined or estimated based on motion data 110(1), then a gaze visualization cannot be generated for the corresponding person at the given time. In some embodiments, motion analysis application 112(1) identifies, based on motion data 110(1), one or more additional data visualizations 114(1) that are available for the virtual avatar at the current time, and displays commands corresponding to the identified additional data visualizations 114(1) and does not display commands corresponding to additional data visualizations 114(1) that are not available.

Selecting a specific command associated with the virtual avatar causes motion analysis application 112(1) to perform one or more actions associated with the command. For example, if a user modifies the time associated the virtual avatar, motion analysis application 112(1) identifies a subset of motion data 110(1) associated with the person corresponding to the virtual avatar and the modified time. Motion analysis application 112(1) determines, based on the subset of motion data 110(1), an updated position, orientation, and/or pose for displaying the virtual avatar in AR scene 124. Motion analysis application 112(1) positions, orients, and/or poses the virtual avatar based on the updated position, orientation, and or pose, and causes updated virtual avatar to be displayed within AR scene 124. As another example, if a user selects a command for displaying an additional data visualization 114(1), motion analysis application 112(1) generates the additional data visualization 114(1) and causes the additional data visualization 114(1) to be displayed within AR scene 124.

In some embodiments, selecting specific body part of a virtual avatar causes motion analysis application 112(1) to display, within AR scene 124, one or more commands associated with the specific body part of the virtual avatar, such as a trajectory, ghost visualization, specter visualization, gaze visualization, touch visualization, footprint visualization, and so forth. The specific command(s) associated with a given body part can vary depending on the body part. For example, each body part could be associated with trajectories, ghost visualizations, and specter visualizations. Additionally, the head could be associated with gaze visualization, the hands could be associated with touch visualization, the hips could be associated with a trajectory of the entire body, and the feet could be associated with footprint visualization as well as heatmaps associated with an individual person (e.g., how much of the person's movement occurred in different areas of the ER environment).

In some embodiments, selecting an additional data visualization, such as a trajectory, ghost visualization, specter visualization, gaze visualization, touch visualization, or footprint visualization, causes motion analysis application 112(1) to display, within AR scene 124, one or more commands associated with the data visualization. The one or more commands include commands to modify parameters associated with the data visualization, such as modifying the associated point in time or period of time. For example, the period of time associated with a trajectory, specter visualization, or footprint visualization could be modified. As another example, the field of view used to generate a gaze visualization could be modified. Similarly, the interval of time used for generating the multiple virtual avatars of a specter visualization could be modified.

In some embodiments, different interactions with a data visualization 114(1) correspond to different commands associated with the data visualization 114(1). Performing an interaction with a data visualization 114(1) causes motion analysis application 112(1) to perform one or more actions associated with the corresponding command. The interactions could be interactions via an input device, such as one or more AR controller 126. The type of interaction that corresponds to each command can differ depending on the particular implementation.

As an example, a user could perform a tap-and-hold gesture on a virtual avatar using an AR controller 126 and move the AR controller 126 towards the left and right to adjust the current point in time of the avatar backward and forward, respectively. In response to the user performing the tap-and-hold gesture and moving the AR controller 126 left or right, motion analysis application 112(1) determines a new point in time and updates the virtual avatar accordingly. As another example, a user could use AR controller 126 to select and drag the end points of a trajectory to adjust the period of time corresponding to the trajectory. As a third example, a user could double-tap a data visualization, such as a virtual avatar or ghost preview, to "pin" the data visualization in place. In response to the user performing the double-tap on the data visualization, motion analysis application 112(1) pins the data visualization such that the data visualization does not update when a current point in time is updated for other data visualizations.

Additionally, in some embodiments, interactions with a data visualization 114(1) could include user movements relative to the data visualization 114(1), such as the user looking at the data visualization 114(1), the user looking at a specific portion of the data visualization 114(1), the user turning towards the data visualization 114(1), and the like. For example, if motion analysis application 112(1) determines that the user is looking at a specific spot on a trajectory, motion analysis application 112(1) could generate a ghost visualization corresponding to the specific spot on the trajectory.

Optionally, in some embodiments, motion analysis application 112(1) receives user input from a computing device separate from AR computing device 102. Referring to FIG. 1, AR computing device 102 is communicatively coupled to a user device 130. Motion analysis application 112(1) is configured to transmit data to and receive user input from a motion analysis application 112(2) on user device 130.

In some embodiments, motion analysis application 112(1) selects a subset of motion data 110(1) to transmit to motion analysis application 112(2). For example, if motion data 110(1) includes position and orientation information for different joints and/or body parts of a person in addition to overall position and orientation information of the person, motion analysis application 112(1) could select a subset of motion data 110(1) that includes the overall position and orientation information of each person, but not the position and orientation of different joints or body parts. Motion analysis application 112(2) stores the received data as motion data 110(2).

In some embodiments, motion analysis application 112(1) further transmits data related to the one or more data visualizations 114(1) and/or data related to a current ER scene to motion analysis application 112(2). Data relating to the one or more data visualizations 114(1) include, for example, a list of virtual avatars, a color associated with each virtual avatar, and an identifier associated with each virtual avatar. Data relating to an ER scene includes, for example, a current point in time associated with the ER scene, the data visualizations 114(1) currently displayed within the ER scene, a current point in time associated with each data visualization 114(1) displayed in the ER scene, and a current viewpoint of the user. In some embodiments, motion analysis application 112(1) transmits updated data related to the one or more data visualizations 114(1) to motion analysis application 112(2) when motion analysis application 112(1) updates, generates, and/or removes a data visualization 114(1). In some embodiments, motion analysis application 112(1) transmits updated data related to the current ER scene when motion analysis application 112(1) updates the current ER scene. In some embodiments, motion analysis application 112(1) transmits a floorplan associated with an ER environment and/or data associated with the floorplan, such as a 3D model of the ER environment, that motion analysis application 112(2) can use to generate a floorplan of the ER environment. In some embodiments, the floorplan is associated with the same coordinate system as the ER environment. Accordingly, coordinate positions of the one or more data visualizations 114(1) within the ER environment correspond to the same coordinate (X and Y coordinate) positions within the floorplan.

In some embodiments, motion analysis application 112(2) generates, based on the motion data 112(2), one or more data visualizations 114(2). The one or more data visualizations 114(2) include images, text, and other 2D elements that can be used to provide an overview of the motion data 112(2). In some embodiments, the one or more data visualizations 114(2) include a floorplan view that includes an overhead view (a floorplan) of a 3D space and locations of different objects within the 3D space, such as 2D trajectories corresponding to each person whose movements were captured in motion data 112(2), current locations of virtual avatars displayed in an ER scene of the 3D space, and a current viewpoint of the user within the ER scene of the 3D space. In some embodiments, the one or more data visualizations 114(2) include an avatar view that includes a list of the virtual avatars generated by motion analysis application 112(1) and information associated with each virtual avatar, such as the identifier for each virtual avatar, the color corresponding to each virtual avatar, and whether each virtual avatar is currently displayed in an ER scene by motion analysis application 112(2).

In some embodiments, the one or more data visualizations 114(2) include one or more graphical user interface (GUI) elements for interacting with the one or more data visualizations 114(1) generated by motion analysis application 112(1). The one or more GUI elements include, for example, controls for modifying the current time associated with all virtual avatars, the current time associated with each individual virtual avatar, starting playback of movement of all virtual avatars, stopping playback of movement of all virtual avatars, starting playback of movement of an individual virtual avatar, stopping playback of movement of an individual virtual avatar, pinning an individual virtual avatar, showing or hiding selected avatars, and/or displaying additional data visualizations 114(1) associated with the virtual avatar, such as a trajectory, ghost visualization, specter visualization, gaze visualization, touch visualization, footprint visualization, and so forth. For example, an avatar view could include sliders for adjusting a current point in time of each virtual avatar, buttons for displaying additional data visualizations associated with each virtual avatar, and selectable elements for pinning, showing, or hiding each virtual avatar. As another example, a user could select trajectories and/or avatars in a floorplan view to hide all trajectories and avatars except those that were selected. The user could select avatars and/or trajectories individually, for example, by tapping on a avatar or trajectory displayed in the floorplan view or select the avatars and/or trajectories as a group, for example, by a lasso tool, click and drag, point and drag, or other area selection mechanisms. If a user selects an area within the floorplan view, motion analysis application 112(2) could identify avatars that were included in a selected area and/or whose trajectories passed through the selected area. Additionally, in some embodiments, the one or more GUI elements include elements for modifying a current viewpoint of an ER scene, such as modifying a location and/or orientation of the user within the ER scene. In response to receiving user input associated with the one or more GUI elements, motion analysis application 112(2) transmits the user input and/or a corresponding command to motion analysis application 112(1). Motion analysis application 112(1) performs one or more actions based on the user input and/or the corresponding command.

Figure 4:
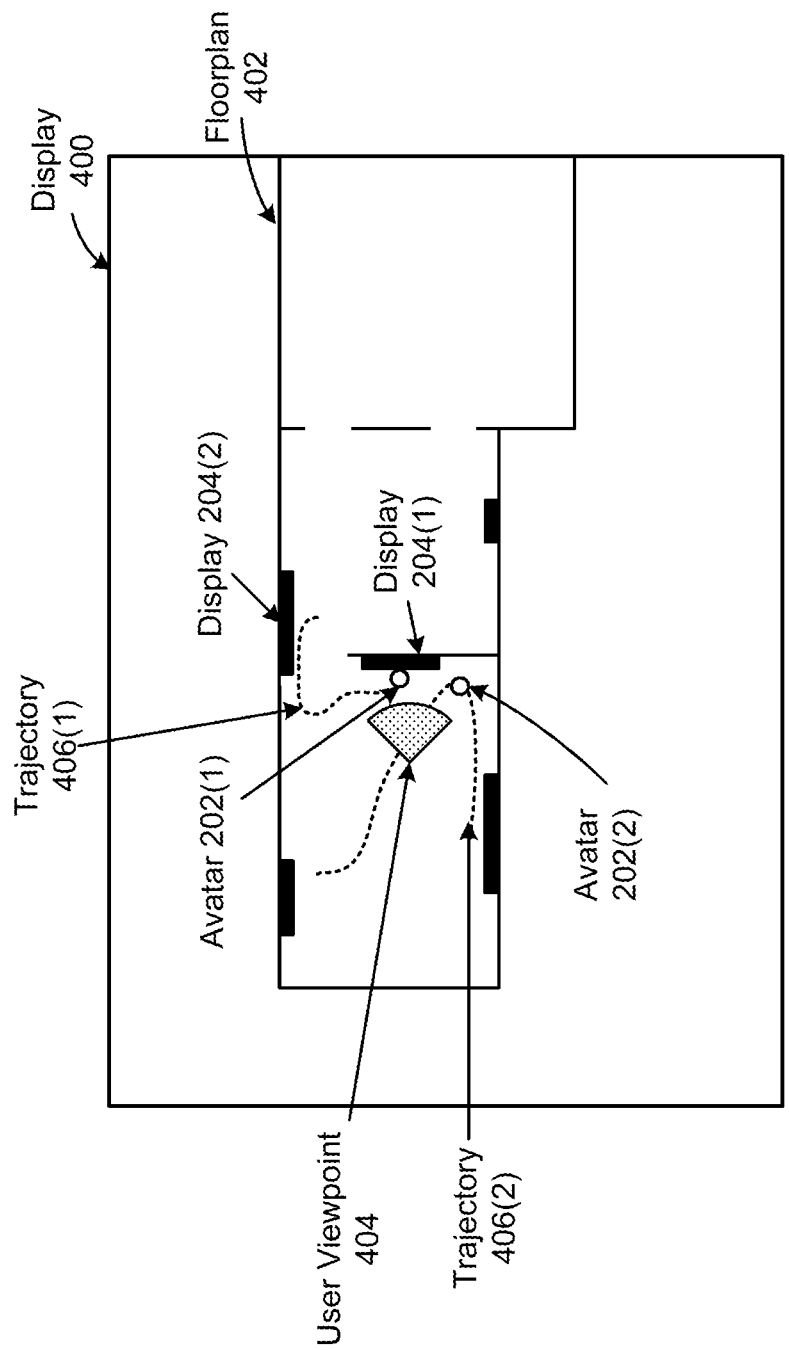
FIG. 4 illustrates exemplar data visualizations displayed within a user device, according to various embodiments.

FIG. 4 illustrates exemplar data visualizations displayed within a user device 130, according to various embodiments. As shown in FIG. 4, a floorplan 402 is displayed within a display 400. Display 400 could be any suitable display device included in user device 130. In some embodiments, display 400 is a touchscreen device that can both display data visualizations 114(2) and receive user input associated with the data visualizations 114(2).

Floorplan 402 is an overhead view of the 3D space corresponding to motion data 110(1) and 110(2). As shown in FIG. 4, floorplan 402 indicates a layout of walls and doorways of the 3D space, as well as the locations of different real-world objects within the 3D space, such as display 204(1) and display 204(2).

In some embodiments, floorplan 402 includes graphical elements that indicate a current location of virtual avatars that are displayed within an ER environment of the 3D space, such as avatars 202(1) and 202(2). Motion analysis application 112(2) determines the current location of each virtual avatar on floorplan 402 based on the data received from motion analysis application 112(1) indicating the positions of different virtual avatars. Motion analysis application 112(2) generates a graphical element at each location. As shown in FIG. 4, the location of avatars 202(1) and 202(2) are indicated on floorplan 402. Although FIG. 4 illustrates circles corresponding to avatar 202(1) and 202(2), any suitable graphical element, such as other geometric shapes or images, could be used.

In some embodiments, floorplan 402 includes a graphical element that indicates a current viewpoint corresponding to an ER scene displayed at the ER computing device. Motion analysis application 112(2) determines the current viewpoint relative to floorplan 402 based on the data received from motion analysis application 112(1) indicating the current viewpoint of a user. In some embodiments, motion analysis application 112(2) determines the position and orientation corresponding to the current viewpoint. Motion analysis application 112(2) generates a graphical element that indicates the orientation of the user at the location on floorplan 402 corresponding to the position corresponding to the current viewpoint. As shown in FIG. 4, floorplan 402 includes a graphical element corresponding to user viewpoint 404. The graphical element indicates the location within floorplan 402 of the user as well as the direction that the user is facing. Based on the graphical element, a user can determine that the current viewpoint 404 faces display 204(1) and the current position of avatar 202(1).

In some embodiments, floorplan 402 includes one or more graphical elements that indicate, for each person whose movements were captured in motion data 110(1) and 110(2), the trajectory of the person. To generate a trajectory for a person, motion analysis application 112(2) selects a subset of motion data 110(2) corresponding to the person. Motion analysis application 112(2) determines, based on the subset of motion data, different locations on floorplan 402 that the person was positioned at and an order of the different locations. Motion analysis application 112(2) generates a graphical element indicating the different positions and the order in which the different locations were visited. As shown in FIG. 4, floorplan 402 includes a trajectory 406(1) corresponding to avatar 202(1) and a trajectory 406(2) corresponding to avatar 202(2). Although FIG. 4 illustrates the trajectories 406(1) and 406(2) as dotted lines, any suitable graphical elements can be used to represent the trajectories.

In some embodiments, motion analysis application 112(1) associates a color with each person whose movements were captured in motion data 110(1). Motion analysis application 112(2) determines, based on the data received from motion analysis application 112(1), the color associated with each person. Motion analysis application 112(2) displays graphical elements corresponding to a given person with the color associated with that person.

In various embodiments, a user can interact with the data visualizations displayed within display 400 to control the one or more data visualizations 114(1) displayed within an ER scene. Motion analysis application 112(2) receives user input associated with an interaction with a data visualization, and transmits the user input and/or one or more commands corresponding to the user input to motion analysis application 112(1). Motion analysis application 112(1) performs one or more actions based on the user input and/or the one or more commands, such as generating an additional data visualization 114(1), modifying a data visualization 114(1), showing a data visualization 114(1), or hiding a data visualization 114(1). For example, selecting one or more virtual avatars in floorplan 402 could cause motion analysis application 112(1) to hide all other virtual avatars in an ER environment except the selected virtual avatars. As another example, selecting one or more trajectories in floorplan 402 could cause motion analysis application 112(1) to hide all virtual avatars in the ER environment except virtual avatars corresponding to the selected trajectories. The one or more virtual avatars and/or trajectories could be selected individually, for example, by tapping on a virtual avatar or trajectory in floorplan 402 or as a group, for example, by a lasso tool, click and drag, point and drag, or other area selection mechanisms. A user could also select a GUI element or perform an interaction, such as a double tap, to restore hidden virtual avatars to the ER environment.

In various embodiments, motion analysis application 112 (2) is not configured to generate any virtual objects for display in an ER environment. Instead, motion analysis application 112(2) generates data visualizations 114(2) that provide additional information for the data visualizations 114(1) that are displayed within an ER environment.

In various embodiments, motion analysis application 112 (2) receives one or more data visualizations 114(2) from motion analysis application 112(1), instead of receiving data from motion analysis application 112(1) and generating the one or more data visualizations 114(2). Motion analysis application 112(1) generates one or more data visualizations 114(2) based on motion data 110(1), information associated with the one or more data visualizations 114(1), and/or information associated with an ER scene. Motion analysis application 112(1) transmits the one or more data visualizations 114(2) for display at user device 130.

FIG. 5 is a flowchart of method steps for generating virtual avatars within an extended reality environment based on captured in motion data 110(1), according to various embodiments. Although the method steps are described in conjunction with the system of FIG. 1, persons skilled in the art will understand that any system configured to perform the method steps in any order falls within the scope of the present disclosure.

As shown in FIG. 5, a method 500 begins at step 502, where an ER computing device receives motion data associated with movements of one or more people within a 3D environment. For example, AR computing device 102 receives motion data 110(1) indicating the movements of one or more people within a real-world environment. In some embodiments, the motion data includes, for each person, the position and orientation of the person at different points in time. The position of a person indicates the location within the 3D environment at which the person is located at a given point in time. The orientation of the person indicates the direction that the person is facing at a given point in time. In some embodiments, the motion data could include, for each person, the position and orientation of different joints and/or body parts of the person at different points in time.

At step 504, the ER computing device processes the motion data to generate, for each person, a virtual avatar corresponding to the person. For example, AR computing device 102 processes motion data 110(1) to generate a virtual avatar corresponding to each person whose movements were included in motion data 110(1). Processing motion data to generate a virtual avatar is performed in a manner similar to that described above with respect to motion analysis application 112(1).

In some embodiments, the ER computing device stores a pre-generated human-shaped 3D model. To generate a virtual avatar for a person, the ER computing device analyzes the motion data to determine a physical size of the person. The ER computing device scales the size of the 3D model according to the physical size of the person. In some embodiments, if the motion data does not include sufficient information for the ER computing device to determine the physical size of the person, then the ER computing device generates a virtual avatar using the pre-generated 3D model without scaling the 3D model.

In some embodiments, the ER computing device determines a physical size of a person based on the positions of different joints and/or body parts of the person. The ER computing device determines, based on the motion data, the locations of one or more pairs of joints and/or body parts of the person that correspond to the same point in time. The ER computing device computes a body dimension associated with a pair of joints and/or body parts based on the locations of the joints and/or body parts within the pair. The ER computing device scales the pre-generated 3D model to match the one or more computed body dimensions.

At step 506, the ER computing device determines a position of each virtual avatar within an ER scene of the 3D environment at an initial time. The initial time could be a point in time that the motion data begins or a specific point in time selected by a user. Determining a position of each virtual avatar is performed in a manner similar to that described above with respect to motion analysis application 112(1).

In some embodiments, to determine a position of a virtual avatar, the ER computing device identifies a subset of motion data that corresponds to the initial time and is associated with the person to which the virtual avatar corresponds. The ER computing device determines, based on the subset of motion data, the position of the person within the 3D environment. If the motion data indicates the position of the person, then the ER computing device determines the position of the person based on the position indicated by the subset of motion data. If the motion data indicates the position of different joints or body parts of the person, then the ER computing device determines the position of the person based on the position of the different joints or body parts indicated by the subset of motion data. The ER computing device converts the position of the person within the 3D environment to a position within an ER scene of the 3D environment.

Additionally, in some embodiments, the ER computing device determines an orientation of the virtual avatar. The ER computing device determines, based on the subset of motion data, the orientation of the person within the 3D environment. If the motion data indicates the orientation of the person, then the ER computing device determines the orientation of the person based on the position indicated by the subset of motion data. If the motion data indicates the orientation of different joints or body parts of the person, then the ER computing device determines the orientation of the person based on the orientation of the different joints or body parts indicated by the subset of motion data. The ER computing device converts the orientation of the person within the 3D environment to an orientation within an ER scene of the 3D environment.

At step 508, the ER computing device displays each virtual avatar within the ER scene based on the position of the virtual avatar and a current viewpoint of the user. Displaying virtual avatars within an ER scene is performed in a manner similar to that described above with respect to motion analysis application 112(1) and AR scene 124.

Each virtual avatar is displayed within an ER environment according to the position of the virtual avatar. Additionally, in some embodiments, each virtual avatar is displayed within the ER environment according to the orientation of the virtual avatar. In some embodiments, each virtual avatar is displayed with a pose corresponding to the position and orientation of different joints and/or body parts of the virtual avatar. In some embodiments, motion analysis application 112(1) associates each person with a different color. The virtual avatar for a person is displayed using the color associated with the person.

The current viewpoint of the user corresponds to the portion of the ER environment that the user is able to see. The current viewpoint could be based on, for example, the current position of the user relative to the ER environment, the current orientation of the user relative to the ER environment, the line of sight of the user within the ER environment, and the current orientation of the head of the user. The ER scene captures the portion of the ER environment that is seen when viewing the ER environment from the current viewpoint of the user. Accordingly, the position and orientation of each virtual avatar relative to the ER scene and, accordingly, to the user, varies based on the current viewpoint of the user. Some virtual avatars that are within the ER environment at the initial time may not be visible within the ER scene based on the current viewpoint.

In some embodiments, if no motion data corresponding to the initial time is associated with a person, then ER computing device determines that the virtual avatar corresponding to the person should not be displayed within the ER scene at the initial time. The ER computing device also does not determine a position or orientation of the virtual avatar.

Figure 6:
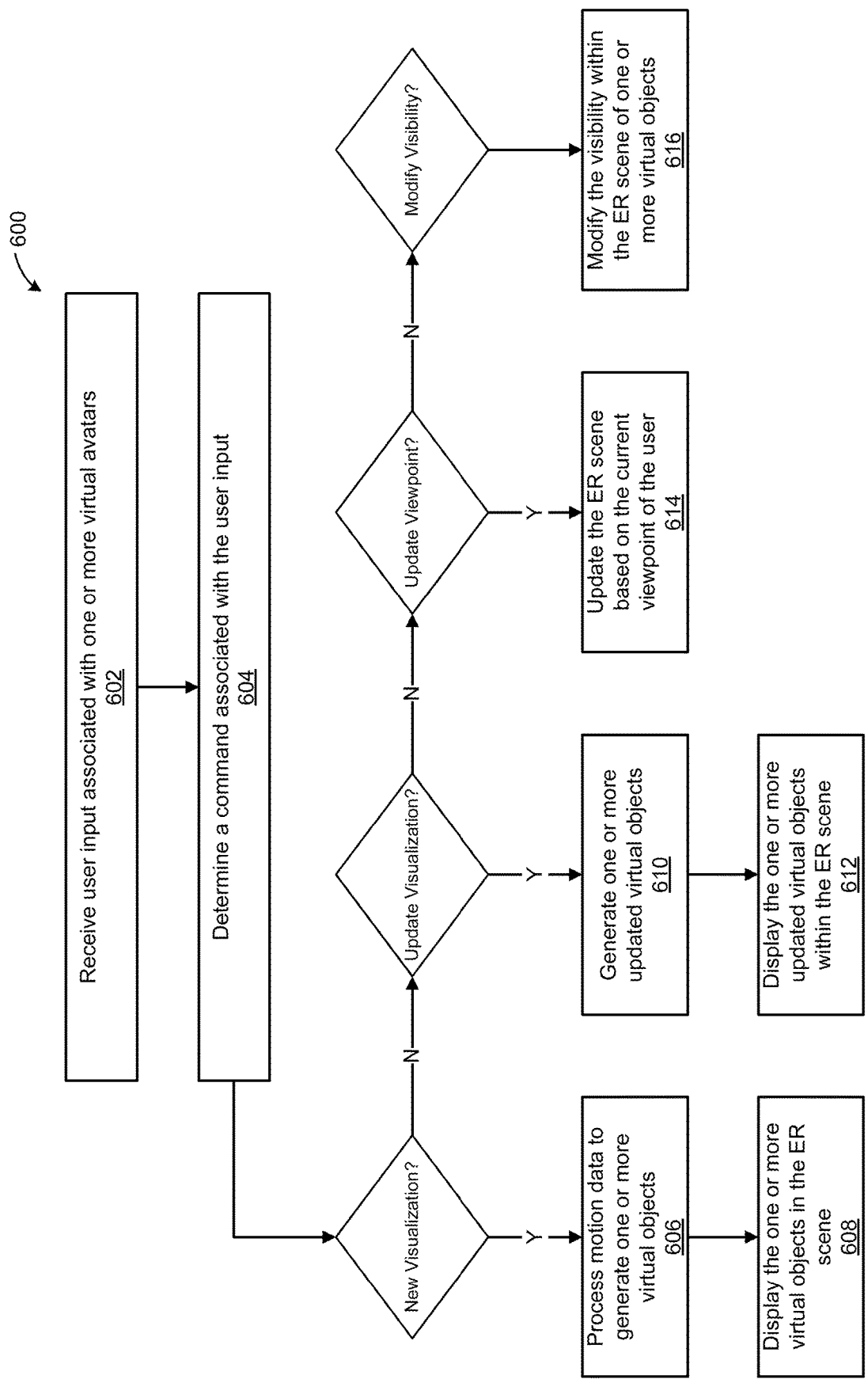
FIG. 6 is a flowchart of method steps for updating an extended reality environment based on user input, according to various embodiments.

FIG. 6 is a flowchart of method steps for updating an extended reality environment based on user input, according to various embodiments. Although the method steps are described in conjunction with the system of FIG. 1, persons skilled in the art will understand that any system configured to perform the method steps in any order falls within the scope of the present disclosure.

As shown in FIG. 6, a method 600 begins at step 602, where an ER computing device receives user input associated with one or more virtual avatars. The user input could be from one or more I/O devices connected to the ER computing device, such as an ER controller, or from one or more I/O devices connected to a user device. For example, AR computing device 102 could receive user input from an AR controller 126, another I/O device 106, or from an I/O device 134 connected to user device 130. The user input could include, for example, a selection of the one or more virtual avatars, a selection of a command associated with the one or more virtual avatars, a selection of a command associated with a portion of the one or more virtual avatars, a selection of a command associated with an additional data visualization that corresponds to the one or more virtual avatars, a user interaction with the one or more virtual avatars, or a user interaction with an additional data visualization that corresponds to the one or more virtual avatars.

At step 604, the ER computing device determines a command associated with the user input. In some embodiments, the ER computing device further determines a virtual object, or portion of a virtual object, associated with the command. For example, if the user input corresponds to a command to displaying an additional data visualization, ER computing device determines which virtual avatar the additional data visualization is associated with and whether the data visualization corresponds to the entire virtual avatar or a specific body part of the virtual avatar. In some embodiments, if the user input includes an interaction with a virtual object, the ER computing device determines a type of interaction and the virtual object that the user interacted with. The ER computing device determines a command associated with the virtual object and the type of interaction. For example, a tap gesture on the torso of a virtual avatar could correspond to a command to playback movement of the virtual avatar, while a tap gesture on a location on a trajectory could correspond to a command to generate a ghost visualization at the location on the trajectory.

If the command is to generate a new data visualization associated with the one or more virtual avatars, at step 606, the ER computing device processes motion data to generate one or more virtual objects for the new data visualization. User input specifying a command to generate a new data visualization could include, for example, a selection of a graphical interface element (e.g., menu button or icon) that corresponds to the new data visualization, an interaction with a virtual avatar that corresponds to generating a new data visualization, or an interaction with a data visualization associated with a virtual avatar (e.g., trajectory) that corresponds to generating a new data visualization. Processing motion data to generate one or more virtual objects for the new data visualization is performed in a manner similar to that discussed above with respect to motion analysis application 112(1) and the one or more data visualizations 114(1).

In some embodiments, the ER computing device determines a data visualization type of the new data visualization. The ER computing device performs one or more data analytics or processing operations on the motion data based on the data visualization type of the new data visualization. The ER computing device generates one or more virtual objects included in the data visualization based on the results of the data analytics or processing operations. The specific data analytics or processing operations performed on the motion data and the type of virtual objects generated based on the results of the analytics or processing operations vary depending on the type of data visualization.

If the new data visualization is a trajectory, then the ER computing device determines the person and the period of time corresponding to the trajectory. In some embodiments, the ER computing device determines a person corresponding to the trajectory by determining which virtual avatar the user input was associated with. Additionally, user input could specify the period of time corresponding to the trajectory. In some embodiments, if the user input did not specify a period of time, then the ER computing device uses the full length of time of the motion data as the period of time. The ER computing device identifies a subset of motion data that corresponds to the person and is within the period of time. The ER computing device determines one or more locations that the person was at during the period of time based on the subset of motion data. The ER computing device generates one or more virtual objects representing a path of the person through the 3D environment based on the one or more locations.

If the new data visualization is a ghost visualization, then the ER computing device determines the person and the point in time or location within the ER environment corresponding to the ghost visualization. In some embodiments, the ER computing device determines a person corresponding to the ghost visualization by determining which virtual avatar or other data visualization associated with the virtual avatar that the user input was associated with. Additionally, user input could specify the point in time or location corresponding to the ghost visualization. The ER computing device identifies a subset of motion data that corresponds to the person and the specified point in time or location. The ER computing device determines a position, orientation, and/or pose of the person at the specified point in time or location based on the subset of motion data. The ER computing device generates a virtual avatar of the person that corresponds to the position, orientation, and/or pose of the person at the specified point in time or location.

If the new data visualization is a specter visualization, then the ER computing device determines the person and the period of time corresponding to the specter visualization. In some embodiments, the ER computing device determines a person corresponding to the specter visualization by determining which virtual avatar or other data visualization associated with the virtual avatar that the user input was associated with. Additionally, user input could specify the period of time corresponding to the specter visualization. In some embodiments, if the user input did not specify a period of time, then the ER computing device uses the full length of time of the motion data as the period of time. The ER computing device identifies a subset of motion data that corresponds to the person and is within the period of time. The ER computing device selects multiple points in time within the period of time. For each point in time, the ER computing device determines a position, orientation, and/or pose of the person at the point in time and generates a virtual avatar of the person that corresponds to the position, orientation, and/or pose of the person at the point in time.

If the new data visualization is a gaze visualization, then the ER computing device determines the person and the point in time corresponding to the gaze visualization. In some embodiments, the ER computing device determines the person and the point in time by determining which virtual avatar or other data visualization associated with the virtual avatar that the user input was associated with. The point in time is a current point in time represented by the virtual avatar. The ER computing device determines the locations of the eyes of the person. In some embodiments, the ER computing device determines the locations of the eyes of the person based on eye position information included in the motion data. In some embodiments, the ER computing device determines the locations of the eyes of the person based on the location of the eyes of the virtual avatar. In some embodiments, the ER computing device estimates the locations of the eyes of the person based on the position and orientation of the head of the virtual avatar. The ER computing device casts multiple rays from the locations of the eyes towards the environment. In some embodiments, the direction of the multiple rays is constrained to a conical area corresponding to a field of view (e.g., 120 degrees) or a focused field of view (e.g., 10 degrees) The ER computing device determines, for each ray, whether the ray intersects an element of the ER environment. If a ray intersects an element of the ER environment, the ER computing device generates a virtual object corresponding to the intersection.

If the new data visualization is a touch visualization, then the ER computing device determines the person and the point in time corresponding to the touch visualization. In some embodiments, the ER computing device determines the person and the point in time by determining which virtual avatar or other data visualization associated with the virtual avatar that the user input was associated with. The point in time is a current point in time represented by the virtual avatar. The ER computing device determines the locations of the fingers of the person. In some embodiments, the ER computing device determines the locations of the fingers of the person based on finger position information included in the motion data. In some embodiments, the ER computing device determines the locations of the fingers of the person based on the location of the fingers of the virtual avatar. In some embodiments, the ER computing device estimates the locations of the fingers of the person based on the position and orientation of the hands of the virtual avatar. The ER computing device whether any of the fingers of the person are within a threshold distance of an element of the ER environment. If a finger is within a threshold distance of an element of the ER environment, the ER computing device generates a virtual object corresponding to the finger touching the element of the ER environment.

If the new data visualization is a footprint visualization, then the ER computing device determines the person and the period of time corresponding to the footprint visualization. In some embodiments, the ER computing device determines a person corresponding to the footprint visualization by determining which virtual avatar or other data visualization associated with the virtual avatar that the user input was associated with. Additionally, user input could specify the period of time corresponding to the footprint visualization. In some embodiments, if the user input did not specify a period of time, then the ER computing device uses the full length of time of the motion data as the period of time. The ER computing device identifies a subset of motion data that corresponds to the person and is within the period of time. The ER computing device selects multiple points in time within the period of time. For each point in time, the ER computing device determines whether a foot of the person was contacting the ground. If the ER computing device determines that a foot was contacting the ground, the ER computing device generates a virtual object corresponding to a footprint of the foot.

At step 608, the ER computing device displays the one or more virtual objects in the ER scene. Displaying the one or more virtual objects in the ER scene is performed in a manner similar to that discussed above with respect to motion analysis application 112(1) and the one or more data visualizations 114(1). In some embodiments, displaying the one or more virtual objects in the ER scene includes determining a position within an ER environment of each virtual object. Additionally, displaying the one or more virtual objects in the ER scene could include determining an orientation within an ER environment of each virtual object. The ER computing device positions and/or orients each virtual object based on the determined position and/or orientation.

If the command is to update the one or more virtual avatars or to update one or more data visualizations associated with the one or more virtual avatars, at step 610, the ER computing device generates one or more updated virtual objects. User input specifying a command to update a data visualization could include, for example, a selection of a new point in time for the one or more data visualizations, a modification to the period of time for the one or more data visualizations, an interaction with the one or more data visualizations that corresponds to modifying the point in time or period of time for the one or more data visualizations, or other user input that modify the appearance of the one or more data visualizations or the underlying parameters used to generate the one or more data visualizations.

In some embodiments, the ER computing device processes motion data based on the command to generate one or more virtual objects for the one or more updated data visualizations. Processing motion data to generate one or more virtual objects for the updated data visualization is performed in a manner similar to that discussed above with respect to motion analysis application 112(1) and the one or more data visualizations 114(1) as well as in step 606 above.

In some embodiments, the user input specifies an updated point in time associated with the virtual avatar. The ER computing device identifies a subset of motion data associated with the person corresponding to the virtual avatar and at the updated point in time. The ER computing device determines, based on the subset of motion data, an updated position, orientation, and/or pose for the virtual avatar.

In some embodiments, the user input specifies an updated point in time for a data visualization associated with a virtual avatar. The ER computing device identifies a subset of motion data associated with the person corresponding to the virtual avatar and at the updated point in time. The ER computing device generates one or more virtual objects for an updated data visualization based on the subset of motion data.

In some embodiments, the user input specifies an updated period of time for a data visualization associated with a virtual avatar. The ER computing device identifies a subset of motion data associated with the person corresponding to the virtual avatar that is within the updated period of time. The ER computing device generates one or more virtual objects for an updated data visualization based on the subset of motion data.

In some embodiments, if the one or more data visualizations includes a data visualization that has been "pinned," then the ER computing device does not update the data visualization based on the user input. The ER computing device updates any other data visualizations that have not been pinned by the user.

At step 612, the ER computing device displays the one or more updated virtual objects within the ER scene. Displaying the one or more updated virtual objects in the ER scene is performed in a manner similar to that discussed above with respect to motion analysis application 112(1) and the one or more data visualizations 114(1). In some embodiments, displaying the one or more updated virtual objects in the ER scene includes determining a position within an ER environment of each virtual object. Additionally, displaying the one or more updated virtual objects in the ER scene could include determining an orientation within an ER environment of each virtual object. The ER computing device positions and/or orients each updated virtual object based on the determined position and/or orientation.

If the command is to update the viewpoint of the ER scene, then at step 614, the ER computing device updates the display of the ER scene based on the current viewpoint of the user. User input associated with a command to update the viewpoint of the ER scene could be, for example, input indicating that the user has physically moved within a real-world environment, input indicating that the user has physically moved their head, navigation input for traversing an ER environment, or other input that changes the position, orientation, and/or perspective of the user within the ER environment.

If the command is to modify the visibility of the one or more virtual objects, then at step 616, the ER computing device modifies the visibility of the one or more virtual objects within the ER scene. In some embodiments, the user input specifies one or more data visualizations displayed within an ER scene. The ER computing device determines, for each data visualization, one or more virtual objects associated with the data visualization. The ER computing device hides the one or more virtual objects by removing the one or more virtual objects from the ER scene. In some embodiments, the user input specifies one or more data visualizations hidden from the ER scene. The ER computing device determines, for each data visualization, one or more virtual objects associated with the data visualization and displays the one or more virtual objects in the ER scene.

In sum, a motion analysis application receives motion data that captures the movement of one or more people within a 3D space. The motion analysis application processes and analyzes the motion data to generate a virtual avatar corresponding to each person. The motion analysis application also determines, for a given point in time, whether each person was present within the 3D space and if so, the position, orientation, and/or pose of the person within the 3D space. If a person was present within the 3D space, the corresponding virtual avatar is displayed within an ER environment of the 3D space based on the position, orientation, and/or pose of the person within the 3D space.

The motion analysis application further processes and analyzes the motion data to generate one or more data visualizations associated with a given person. The one or more data visualizations include additional virtual avatars corresponding to the position, orientation, and/or pose of the person at other points in time, as well as visualizations that reflect interactions of the person with the 3D space, such as objects that that person was looking at, objects that the person touched, and places that the person stepped within the 3D space.

At least one technical advantage of the disclosed techniques relative to the prior art is that, with the disclosed techniques, human motion data is more effectively analyzed and visualized in the context of the space in which the human motion data was captured. In particular, by generating data visualizations that include virtual avatars of people within a given space, human motion data analysis can be performed that analyzes specific behaviors and interactions of the people within the space. Accordingly, using the disclosed techniques, more detailed analysis of human movement can be performed relative to prior approaches that provide only a high-level overview of human movement 1. In some embodiments, a computer-implemented method for analyzing human motion data comprises receiving a set of motion data that indicates one or more movements of a first person within a real-world environment; generating a first virtual avatar corresponding to the first person based on the set of motion data; determining a first position of the first virtual avatar within an extended reality (ER) environment based on the one or more movements; and displaying the first virtual avatar within the ER environment based on the first position.

2. The method of clause 1, further comprising determining a first orientation of the first virtual avatar within the ER environment based on the one or more movements, wherein displaying the first virtual avatar within the ER environment is further based on the first orientation.

3. The method of clause 1 or 2, further comprising determining a first pose of the first virtual avatar within the ER environment based on the one or more movements, wherein displaying the first virtual avatar in the ER environment is further based on the first pose.

4. The method of any of clauses 1-3, wherein determining the first pose of the first virtual avatar comprises determining a position of at least one joint of the first virtual avatar within the ER environment based on the set of motion data.

5. The method of any of clauses 1-4, wherein determining the first pose of the first virtual avatar comprises determining a position of at least one body part of the first virtual avatar within the ER environment based on the set of motion data.

6. The method of any of clauses 1-5, further comprising generating one or more virtual objects associated with the first virtual avatar based on the one or more movements; and displaying the one or more virtual objects within the ER environment.

7. The method of any of clauses 1-6, wherein the first position of the first virtual avatar within the ER environment is associated with a position of the first person at a first point in time, and generating the one or more virtual objects comprises identifying a first subset of motion data included in the set of motion data that is associated with the first point in time.

8. The method of any of clauses 1-7, wherein generating the one or more virtual objects comprises determining one or more visual targets of the first person within the real-world environment based on the first position of the first virtual avatar within the ER environment; and generating, for each visual point of contact, a different virtual object corresponding to the visual point of contact.

9. The method of any of clauses 1-8, wherein generating the one or more virtual objects comprises determining one or more physical points of contact between the first person and the real-world environment or one or more people based on the first position of the first virtual avatar within the ER environment; and generating, for each physical point of contact, a different virtual object corresponding to the physical point of contact.

10. The method of any of clauses 1-9, wherein the first position of the first virtual avatar within the ER environment is associated with a first position of the first person at a first point in time, the method further comprising generating a second virtual avatar corresponding to the first person based on the set of motion data; determining a second position of the second virtual avatar within the ER environment based on the one or more movements, wherein the second position is associated with a second position of the first person at a second point in time; and displaying the second virtual avatar within the ER environment based on the second position.

11. In some embodiments, one or more non-transitory computer-readable media include instructions that, when executed by one or more processors, cause the one or more processors to perform the steps of receiving a set of motion data that indicates one or more movements of a first person within a real-world environment; generating a first virtual avatar corresponding to the first person based on the set of motion data; determining a first position of the virtual avatar within an extended reality (ER) environment based on the one or more movements; and displaying the first virtual avatar within the ER environment based on the first position.

12. The one or more non-transitory computer-readable media of clause 11, further comprising determining a first orientation of the first virtual avatar within the ER environment based on the one or more movements, wherein displaying the first virtual avatar within the ER environment is further based on the first orientation.

13. The one or more non-transitory computer-readable media of clause 11 or 12, further comprising determining a first pose of the first virtual avatar within the ER environment based on the one or more movements, wherein displaying the first virtual avatar within the ER environment is further based on the first pose.

14. The one or more non-transitory computer-readable media of any of clauses 11-13, wherein determining the first pose of the first virtual avatar comprises determining at least one of a position of a first joint of the first virtual avatar within the ER environment or a position of a first body part of the first virtual avatar within the ER environment.

15. The one or more non-transitory computer-readable media of any of clauses 11-14, wherein generating the first virtual avatar comprises determining a size of the first person based on the set of motion data and scaling a three-dimensional model of a human based on the size of the first person.

16. The one or more non-transitory computer-readable media of any of clauses 11-15, further comprising receiving user input associated with the first virtual avatar; in response to receiving the user input, generating one or more virtual objects associated with the first virtual avatar based on the one or more movements; and displaying the one or more virtual objects within the ER environment.

17. The one or more non-transitory computer-readable media of any of clauses 11-16, further comprising receiving user input associated with one or more virtual objects displayed within the ER environment; in response to receiving the user input, modifying the one or more virtual objects based on the one or more movements and the user input to generate one or more modified virtual objects; and displaying the one or more modified virtual objects within the ER environment.

18. The one or more non-transitory computer-readable media of any of clauses 11-17, further comprising receiving user input associated with the first virtual avatar; in response to receiving the user input, modifying the first virtual avatar based on the one or more movements and the user input to generate a modified virtual avatar; and displaying the modified virtual avatar within the ER environment.

19. The one or more non-transitory computer-readable media of any of clauses 11-18, wherein the steps are performed at a first computing device, and further comprising receiving user input associated with the first virtual avatar from a second computing device.

20. In some embodiments, a system comprises a display device; one or more memories storing instructions; and one or more processors that are coupled to the one or more memories and, when executing the instructions, perform the steps of receiving a set of motion data that indicates one or more movements of a first person within a real-world environment; generating a first virtual avatar corresponding to the first person based on the set of motion data; determining a first position of the first virtual avatar within an extended reality (ER) environment based on the one or more movements; and displaying, using the display device, the first virtual avatar within the ER environment based on the first position.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for analyzing human motion data, the method comprising:
receiving a set of motion data that indicates one or more movements of a first person within a real-world environment;
generating a first virtual avatar corresponding to the first person based on the set of motion data;
determining a first position of the first virtual avatar within an extended reality (ER) environment based on the one or more movements;
determining a first orientation of the first virtual avatar within the ER environment based on the one or more movements, wherein the first orientation of the first virtual avatar indicates a direction the first virtual avatar is facing and is different from a pose of the first virtual avatar; and
displaying the first virtual avatar within the ER environment based on the first position and the first orientation.

2. The method of claim 1, further comprising determining a first pose of the first virtual avatar within the ER environment based on the one or more movements, wherein displaying the first virtual avatar in the ER environment is further based on the first pose.

3. The method of claim 2, wherein determining the first pose of the first virtual avatar comprises determining a position of at least one joint of the first virtual avatar within the ER environment based on the set of motion data.

4. The method of claim 2, wherein determining the first pose of the first virtual avatar comprises determining a position of at least one body part of the first virtual avatar within the ER environment based on the set of motion data.

5. The method of claim 1, further comprising:
generating one or more virtual objects associated with the first virtual avatar based on the one or more movements; and
displaying the one or more virtual objects within the ER environment.

6. The method of claim 5, wherein the first position of the first virtual avatar within the ER environment is associated with a position of the first person at a first point in time, and generating the one or more virtual objects comprises identifying a first subset of motion data included in the set of motion data that is associated with the first point in time.

7. The method of claim 5, wherein generating the one or more virtual objects comprises:
determining one or more visual targets of the first person within the real-world environment based on the first position of the first virtual avatar within the ER environment; and
generating, for each visual point of contact, a different virtual object corresponding to the visual point of contact.

8. The method of claim 5, wherein generating the one or more virtual objects comprises:
determining one or more physical points of contact between the first person and the real-world environment or one or more people based on the first position of the first virtual avatar within the ER environment; and
generating, for each physical point of contact, a different virtual object corresponding to the physical point of contact.

9. The method of claim 1, wherein the first position of the first virtual avatar within the ER environment is associated with a first position of the first person at a first point in time, the method further comprising:
generating a second virtual avatar corresponding to the first person based on the set of motion data;
determining a second position of the second virtual avatar within the ER environment based on the one or more movements, wherein the second position is associated with a second position of the first person at a second point in time; and
displaying the second virtual avatar within the ER environment based on the second position.

10. One or more non-transitory computer-readable media including instructions that, when executed by one or more processors, cause the one or more processors to perform a set of steps comprising:
receiving a set of motion data that indicates one or more movements of a first person within a real-world environment;
generating a first virtual avatar corresponding to the first person based on the set of motion data;
determining a first position of the virtual avatar within an extended reality (ER) environment based on the one or more movements;
determining a first orientation of the first virtual avatar within the ER environment based on the one or more movements, wherein the first orientation of the first virtual avatar indicates a direction the first virtual avatar is facing and is different from a pose of the first virtual avatar; and
displaying the first virtual avatar within the ER environment based on the first position and the first orientation.

11. The one or more non-transitory computer-readable media of claim 10, further comprising determining a first pose of the first virtual avatar within the ER environment based on the one or more movements, wherein displaying the first virtual avatar within the ER environment is further based on the first pose.

12. The one or more non-transitory computer-readable media of claim 11, wherein determining the first pose of the first virtual avatar comprises determining at least one of a position of a first joint of the first virtual avatar within the ER environment or a position of a first body part of the first virtual avatar within the ER environment.

13. The one or more non-transitory computer-readable media of claim 10, wherein generating the first virtual avatar comprises determining a size of the first person based on the set of motion data and scaling a three-dimensional model of a human based on the size of the first person.

14. The one or more non-transitory computer-readable media of claim 10, further comprising:
receiving user input associated with the first virtual avatar;
in response to receiving the user input, generating one or more virtual objects associated with the first virtual avatar based on the one or more movements; and
displaying the one or more virtual objects within the ER environment.

15. The one or more non-transitory computer-readable media of claim 10, further comprising:
receiving user input associated with one or more virtual objects displayed within the ER environment;
in response to receiving the user input, modifying the one or more virtual objects based on the one or more movements and the user input to generate one or more modified virtual objects; and
displaying the one or more modified virtual objects within the ER environment.

16. The one or more non-transitory computer-readable media of claim 10, further comprising:
receiving user input associated with the first virtual avatar;
in response to receiving the user input, modifying the first virtual avatar based on the one or more movements and the user input to generate a modified virtual avatar; and
displaying the modified virtual avatar within the ER environment.

17. The one or more non-transitory computer-readable media of claim 10, wherein the set of steps are performed at a first computing device, and further comprising receiving user input associated with the first virtual avatar from a second computing device.

18. A system comprising:
a display device;
one or more memories storing instructions; and
one or more processors that are coupled to the one or more memories and, when executing the instructions, perform a set of steps comprising:

receiving a set of motion data that indicates one or more movements of a first person within a real-world environment;

generating a first virtual avatar corresponding to the first person based on the set of motion data;

determining a first position of the first virtual avatar within an extended reality (ER) environment based on the one or more movements;

determining a first orientation of the first virtual avatar within the ER environment based on the one or more movements, wherein the first orientation of the first virtual avatar indicates a direction the first virtual avatar is facing and is different from a pose of the first virtual avatar; and displaying, using the display device, the first virtual avatar within the ER environment based on the first position and the first orientation.

* * * * *